United States Patent
Kout

(10) Patent No.: US 10,468,704 B2
(45) Date of Patent: Nov. 5, 2019

(54) HYDROGEN-REDOX FLOW BATTERY ASSEMBLY

(71) Applicant: ELESTOR BV, Arnhem (NL)

(72) Inventor: Wiebrand Kout, Huissen (NL)

(73) Assignee: ELESTOR BV, Arnhem (NL)

( * ) Notice: Subject to any disclaimer, the term of this patent is extended or adjusted under 35 U.S.C. 154(b) by 297 days.

(21) Appl. No.: 15/323,788

(22) PCT Filed: Jul. 2, 2015

(86) PCT No.: PCT/EP2015/065164
§ 371 (c)(1),
(2) Date: Jan. 4, 2017

(87) PCT Pub. No.: WO2016/001392
PCT Pub. Date: Jan. 7, 2016

(65) Prior Publication Data
US 2017/0133701 A1    May 11, 2017

(30) Foreign Application Priority Data

Jul. 4, 2014 (EP) .................................. 14175827

(51) Int. Cl.
*H01M 8/18* (2006.01)
*H01M 8/20* (2006.01)
(Continued)

(52) U.S. Cl.
CPC ......... *H01M 8/188* (2013.01); *H01M 4/8605* (2013.01); *H01M 8/04089* (2013.01);
(Continued)

(58) Field of Classification Search
CPC .... H01M 8/188; H01M 8/08; H01M 8/04186; H01M 8/04089; H01M 8/20; H01M 8/8605; Y02E 60/528
See application file for complete search history.

(56) References Cited

U.S. PATENT DOCUMENTS

2008/0199774 A1    8/2008   Giddey et al.

FOREIGN PATENT DOCUMENTS

| EP | 2461414 A1 | 6/2012 |
| WO | 0137359 A2 | 5/2001 |

(Continued)

OTHER PUBLICATIONS

Extended European Search Report for corresponding European Application No. 14175827.6, dated Mar. 19, 2015.

(Continued)

*Primary Examiner* — Eugenia Wang
(74) *Attorney, Agent, or Firm* — Workman Nydegger

(57) ABSTRACT

A hydrogen-redox flow battery assembly comprises one or more battery cells and is used to electrochemically generate and store electric power. Each battery cell includes a hydrogen chamber, an electrolyte chamber, a membrane electrode assembly positioned between the hydrogen chamber and the electrolyte chamber, a hydrogen reservoir and an electrolyte reservoir. The hydrogen-redox flow battery assembly is configured to allow an uncontrolled pressure difference between the pressure in the hydrogen chamber and the pressure in the electrolyte chamber, the pressure difference determined by a diffusion of protons through the membrane electrode assembly during a charge and/or a discharge operation. The one or more battery cells of the hydrogen-redox flow battery assembly is/are completely positioned in the hydrogen reservoir.

19 Claims, 7 Drawing Sheets

(51) Int. Cl.
    *H01M 4/86*      (2006.01)
    *H01M 8/04089*   (2016.01)
    *H01M 8/04186*   (2016.01)
    *H01M 8/08*      (2016.01)

(52) U.S. Cl.
    CPC ......... *H01M 8/04186* (2013.01); *H01M 8/08* (2013.01); *H01M 8/20* (2013.01); *Y02E 60/528* (2013.01)

(56) References Cited

FOREIGN PATENT DOCUMENTS

| WO | 2007072096 A1 | 6/2007 |
| WO | 2011089516 A2 | 7/2011 |
| WO | 2011089518 A2 | 7/2011 |
| WO | 2013086100 A1 | 6/2013 |

OTHER PUBLICATIONS

International Search Report for corresponding International PCT Application No. PCT/EP2015/065164, dated Sep. 9, 2015.

HYDROGEN-REDOX FLOW BATTERY ASSEMBLY

FIELD OF THE INVENTION

The present invention generally relates to a flow battery assembly used to electrochemically generate and store electric power, especially to a flow battery assembly in which both charging and discharging reactions happen in the presence of hydrogen and of an electrolyte comprising a halogen ion or a mixture of halogen ions.

BACKGROUND OF THE INVENTION

Solar or wind energy-based systems as well as flow batteries provide solutions to the ever increasing need for the low cost generation and storage of electricity. A flow battery that uses hydrogen and a halogen ion, such as for example bromine, as active materials was invented in 1961 by the National Aeronautics and Space Administration. This type of flow battery demonstrates a high power density, i.e. it can store or release a high power per unit of membrane area. A flow battery relying on hydrogen and a halogen ion can indeed reach a power density of 10 $kW·m^{-2}$, which is 20 times higher than the power density of typical vanadium redox flow batteries. Since 1961, several research groups and companies have investigated cells in which the hydrogen reactant gas is kept at a constant and nearly atmospheric pressure. The hydrogen gas released during charging of the flow battery assembly is either compressed outside the electrochemical flow battery assembly by an external compressor or it is stored at low pressure in a large storage tank. A hydrogen compressor is typically a technically challenging and energy inefficient device, which requires high purchase and maintenance costs. This use of an external mechanical compressor therefore increases the costs associated with the system, reduces its long-term reliability and reduces its efficiency.

WO2011089518 is a patent application from by Ramot at Tel-Aviv University Ltd., filed on Jan. 24, 2011, which describes a system capable of conducting both hydrogen evolution reactions and hydrogen oxidation reactions in the same flow battery assembly. The patent application WO2011089518 describes a system in which the pressure in the hydrogen chamber is maintained at a higher value than in the electrolyte chamber, as well as the method implemented to maintain this pressure difference between the hydrogen chamber and the halogen chamber within a stack of battery cells. The method described in WO2011089518 comprises sensing the pressures in the hydrogen chamber and the electrolyte chamber within a stack of battery cells and adapting the pressure of the electrolyte entering the stack of battery cells in order to maintain the desired pressure difference between the hydrogen chamber and the electrolyte chamber within the stack of battery cells. The pressure in the electrolyte chamber is therefore continuously controlled in function of the pressure in the hydrogen chamber, which makes the use of the flow battery assembly complicated and requires the implementation of extra components such as pumps and sensors which increases the cost associated with such an assembly and reduces its robustness because of an increased risk of component failure. Moreover, even though the patent application WO2011089518 lists advantages associated with maintaining a pressure difference between the hydrogen chamber and the electrolyte chamber, such a control method implementing a tight control of this pressure difference within acceptable limits is deemed necessary in order to avoid damage to the membrane.

WO2013086100 is a patent application from by Sun Catalytix Corp., filed on Dec. 6, 2012 and published on Jun. 13, 2013, which describes a method comprising passing a current through a battery cell in order to produce a partial pressure of the hydrogen in the hydrogen chamber of 200-250 pound-force per square inch gauge, i.e. a maximum pressure 18.25 bar relative to ambient. The method further comprises controlling the pressure in the electrolyte chamber to make it substantially similar or at a predetermined small pressure differential relative to the pressure in the hydrogen chamber. The hydrogen chamber of each battery cell comprises a hydrogen electrode connected to a controllable outlet that is coupled to a control device which is capable of maintaining a predetermined pressure within the hydrogen chamber by suitably controlling this outlet. This requires a manual intervention in order to pre-select the value of the pressure in the hydrogen chamber, which makes the use of the flow battery assembly less reliable. The control of the pressure in the hydrogen chamber further requires the implementation of components such as pumps and sensors, which increases the costs associated with such a flow battery assembly. Although no external hydrogen compressor is required in the hydrogen circuit, similar elements are now required in the electrolyte circuit in order to maintain the pressure difference within acceptable limits in order to avoid damage to the membrane of the battery cell.

WO2007/072096 is a patent application from by H-Cella Inc., filed on Dec. 22, 2006 and published on Jun. 28, 2007, which describes a porous electrode used in an electrochemical cell operating with high differential pressure difference. In the context of the system described in WO2007/072096 a fuel cell is understood as a device or equipment which comprises two electrodes such that, during operation of the fuel cell, hydrogen reacts on the anode and oxygen reacts on the cathode. With the help of a catalytic agent, the hydrogen molecules break up into protons and electrons, and the electrons arriving at the cathode combine with the protons and with the oxygen molecules creating water as a final product. It is clearly stated in WO2007/072096 that if a reversed process to electrolysis takes place, that is if hydrogen gas and oxygen gas react to each other on the electrodes and in the course of this electric current is produced, then the system is called a fuel cell. The fuel cell described in WO2007/072096 therefore relies on the consumption of two gases, hydrogen and oxygen, and the reaction between the two gases results in the production of water. The difference occurring between the amounts of gases generated in the course of electrolysis results in significant pressure difference on the two sides of the membrane of the fuel cell. Indeed, as the amount of gas $H_2$ generated on the cathode is twice as much as the amount of $O_2$ generated on the anode, the gas pressure on the cathode side presses the membrane against the anode. The fuel cell described in WO2007/072096 therefore undergoes a high gas pressure and a high gas pressure difference, where the differential pressure difference relates to the pressure difference occurring in respect of the gases generated in the space of the two electrodes on the one part, and the high pressure difference occurring between the internal space of the fuel cell and the external space. WO2007/072096 does not describe a system in which a cell withstands a pressure difference between a gas and a liquid electrolyte without $O_2$ gas, where an electrolyte is a substance that ionizes when dissolved in suitable ionizing solvents, and which can transmit electric current through positively and negatively charged ions. The fuel cell described in WO2007/072096 is therefore not compatible with a flow battery assembly relying on the consumption of a gas and a liquid electrolyte which does not comprise $O_2$ gas.

The fuel cell described in WO2007/072096 operates with two gases, hydrogen and oxygen, and the reaction between the two gases produces water. The fuel cell described in WO2007/072096 therefore undergoes a high gas pressure and a high gas pressure difference, where the differential pressure difference relates to the pressure difference occurring in respect of the gases generated in the space of the two electrodes on the one part, and the high pressure difference occurring between the internal space of the fuel cell and the external space. It is clear that a hydrogen-redox flow battery assembly cannot be considered as a fuel cell of the type described in WO2007/072096, as a hydrogen-redox flow battery assembly operates with hydrogen and a liquid electrolyte, where the liquid electrolyte is a substance that ionizes when dissolved in suitable ionizing solvents, and which can transmit electric current through positively and negatively charged ions, and where the reaction between the liquid electrolyte and hydrogen produces an electrolyte, but not water or oxygen gas.

It is an objective of the present invention to disclose a flow battery assembly that overcomes the above identified shortcomings of existing tools. More particularly, it is an objective to disclose such flow battery assembly for generating and storing electric power in a simpler, more robust, faster, more efficient, safer, more reliable and more economical manner.

SUMMARY OF THE INVENTION

According to a first aspect of the present invention, the above defined objectives are realized by a hydrogen-redox flow battery assembly comprising:
  one or more battery cells, each battery cell comprising:
    a hydrogen chamber configured to house a flow path of hydrogen gas between a hydrogen inlet and a hydrogen outlet;
    an electrolyte chamber configured to house a flow path of liquid electrolyte between an electrolyte inlet and an electrolyte outlet;
    a membrane electrode assembly comprising a hydrogen electrode connected to the hydrogen chamber and an electrolyte electrode connected to the electrolyte chamber, and a membrane positioned between the hydrogen chamber and the electrolyte chamber, the membrane electrode assembly configured to only allow a diffusion of protons through the membrane electrode assembly between the hydrogen gas in the hydrogen chamber and the liquid electrolyte in the electrolyte chamber;
  a hydrogen reservoir connected to the hydrogen chamber of the one or more battery cells and configured to retain the hydrogen gas; and
  an electrolyte reservoir connected to the electrolyte chamber of one or more battery cells and configured to retain the liquid electrolyte;
Characterized in that:
  the hydrogen-redox flow battery assembly is further configured to allow an uncontrolled pressure difference between the pressure in the hydrogen chamber of the battery cell and the pressure in the electrolyte chamber of the battery cell, wherein the pressure difference is determined by the diffusion of protons through the membrane electrode assembly during a charge and/or a discharge operation; and
  the one or more battery cells of the hydrogen-redox flow battery assembly is/are completely positioned in the hydrogen reservoir.

In general a flow battery assembly is a type of rechargeable battery assembly in which two streams comprising one or more electro-active elements are separated by a membrane. A hydrogen-redox (reduction-oxidation) flow battery assembly is a reversible flow battery assembly with a first material stream comprising hydrogen gas and a second material stream comprising electrochemical components dissolved in an electrolyte; both material streams separated by the membrane. Such a hydrogen-redox flow battery assembly could for example be a hydrogen-halogen flow battery assembly, in which the electrochemical components dissolved in an electrolyte comprise a halogen; or a hydrogen-iron flow battery assembly in which this the electrochemical components comprise iron; or a hydrogen-cerium flow battery assembly, in which the electrochemical components comprise cerium; or a hydrogen-vanadium flow battery assembly, in which the electrochemical components comprise vanadium, etc. An electrolyte is a substance that ionizes when dissolved in suitable ionizing solvents, such as for example water. An electrolyte is a liquid or a gel which contains ions and can be decomposed by electrolysis, and can transmit electric current through positively and negatively charged ions. It is clear the liquid electrolyte is substantially free of oxygen gas, or at least does not comprise oxygen gas in a sufficient concentration to operate a fuel cell. According to the present invention, the liquid electrolyte comprises oxygen in gas phase dissolved in the liquid electrolyte preferably at a concentration lower than 20 ppm, preferably at a concentration lower than 10 mg/L of liquid electrolyte under 1 bar and at 25° C., preferably lower than 1 mg/L of liquid electrolyte under 1 bar and at 25° C., preferably lower than 100 µg/L of liquid electrolyte at a 1 bar and 25° C. The storage capacity of the hydrogen-redox flow battery assembly is determined by the amount of hydrogen and electrolyte that can be stored, while the maximum allowable power is determined by the surface area of its membrane electrode assembly. Therefor an efficient use of the storage, especially of the hydrogen storage, and an optimal surface area of the membrane electrode assembly are strived for, in order to realise a hydrogen-redox flow battery assembly with an increased capacity and maximum power. The hydrogen-redox flow battery assembly according to the present invention is therefore able to withstand a high differential pressure between hydrogen gas and a liquid electrolyte.

In this way, the hydrogen gas and the liquid electrolyte can be stored in the respective hydrogen reservoir and the electrolyte reservoir of the flow battery assembly and can be exchanged with the battery cell in order to generate or capture electricity during a charge or discharge operation. The storage capacity of the battery assembly, which is the total amount of electrical energy that can be stored, depends on the volume of the hydrogen reservoir and of the electrolyte reservoir. The storage capacity of the battery assembly can even be extended by means of the use of replaceable or exchangeable reservoirs. In such a case the flow battery assembly can be recharged simply by re-attaching or exchanging the hydrogen reservoir and/or the electrolyte reservoir with other reservoirs of which the content corresponds to the charged state. The flow of liquid electrolyte from the electrolyte reservoir to the electrolyte inlet and from the electrolyte outlet of the electrolyte chamber back to the electrolyte reservoir creates an electrolyte circuit comprising a circulatory flow of liquid electrolyte between the electrolyte reservoir and the electrolyte chamber. A simple and efficient pump, controlled by a simple control system, can be provided in this electrolyte circuit to provide a suitable flow of the liquid electrolyte, without the need for a complex pressure control system. The flow of hydrogen gas could be similarly implemented with a hydrogen circuit comprising a flow from the hydrogen reservoir to the hydrogen inlet and from the hydrogen outlet of the hydrogen chamber back to the hydrogen reservoir, thus creating a circulatory flow of hydrogen gas between the hydrogen reservoir and the hydrogen chamber. A suitable simple pump could be provided in order to provide a certain flow, however also here there is no need for a complex pressure control system. However, according to a particular simple embodiment the hydrogen inlet and hydrogen outlet of the hydrogen chamber coincide and the hydrogen circuit comprises a single exchange path between the hydrogen chamber and the hydrogen reservoir. This is possible as during the charge and discharge operation the mobility of the hydrogen gas between the hydrogen chamber and the hydrogen reservoir is large enough to cause a sufficiently large exchange with the reservoir under the influence of diffusion and/or bulk flow mechanisms acting in the hydrogen circuit.

In this way, the pressure difference is freely determined by the diffusion of protons through the membrane electrode assembly during a charge and/or a discharge operation of the flow battery assembly. In other words, the pressure difference between the electrolyte chamber and the hydrogen chamber is only determined by the electro-chemical reaction in the battery cell. Additionally, it is clear that in this way the pressure in electrolyte liquid flow circuit comprising the electrolyte chamber remains substantially uniform, and also the pressure in the hydrogen gas flow circuit comprising the hydrogen chamber remains substantially uniform, thus simplifying for example monitoring of the pressure in the hydrogen chamber of the battery cell, as it can be measured at any suitable location in the hydrogen circuit remote from the hydrogen chamber itself. It even allows for the hydrogen gas exchange in the hydrogen circuit to and from the hydrogen chamber to be caused by diffusion without requiring any active elements such as a pump or compressor to actively generate a hydrogen flow. The pressure of the hydrogen gas in the hydrogen chamber is allowed to fluctuate in an uncontrolled manner, i.e. freely, between a predetermined minimum pressure value when the flow battery assembly is fully discharged and a predetermined maximum pressure value when the flow battery assembly is fully charged. Also the pressure of the electrolyte liquid in the electrolyte chamber is allowed to fluctuate in an uncontrolled manner, i.e. freely, with respect to the pressure in the hydrogen chamber, however it should be clear that these fluctuations in the pressure of the electrolyte liquid are much smaller than the fluctuations in the pressure of the hydrogen gas. For example when fully charged the pressure of the hydrogen gas in the hydrogen chamber can reach for example 800 bar, while the pressure in the electrolyte liquid remains for example below 10 bar in all operational states of the battery cell. In this way the predetermined pressure difference between the pressure in the hydrogen chamber and the pressure in the electrolyte chamber can fluctuate for example between 1.1 bar when fully discharged and 800 bar when fully charged, or for example between 5 bar when fully discharged and 150 bar when fully charged.

In this way, advantageously a pressure control system reducing the hydrogen pressure for the hydrogen chamber to a lower level than what is required for optimal storage is no longer required. Nor does the pressure control system then needs to increase the hydrogen pressure of the hydrogen leaving the hydrogen chamber again to a higher level for further storage. There is thus no longer required a higher pressure side at the storage part and a lower pressure side at the battery cell part of the hydrogen circuit. Nor are there required alternative pressure control systems which keep the pressure difference at both sides of the membrane of the battery cell within strict limits by for example increasing the pressure in the electrolyte chamber to match that of the hydrogen chamber. The pressure difference between the pressure in the electrolyte chamber and the pressure in the hydrogen chamber is only determined by the chemical reaction in the battery cell, without the need for a pressure control system comprising for example compressors and expanders. This not only simplifies the construction of the flow battery assembly, drastically reducing the manufacturing costs and the maintaining costs of the flow battery assembly and increasing its reliability it also increases the efficiency of the battery cell, as a pressure control system comprising such elements as compressors, especially in the hydrogen circuit, consumes electrical energy with a low energy conversion efficiency. Additionally this does not compromise the capacity of the hydrogen-redox flow battery assembly as, when fully charged the hydrogen pressure is maximized thus allowing for optimal use of the volume of the hydrogen reservoir, nor the maximum power as the area of the membrane-electrode assembly is not affected. The one or more battery cells of the hydrogen-redox flow battery assembly and the hydrogen reservoir are directly connected to each other. In other words, there is no pressure regulating element implemented between the one or more battery cells of the hydrogen-redox flow battery assembly and the hydrogen reservoir. A pressure regulating element comprises at least one sensor adapted to measure an actual pressure value and at least one active pressure regulator adapted to correct the actual pressure value to a suitable desired pressure value. Hydrogen is therefore allowed to freely flow from the hydrogen reservoir to the one or more battery cells of the hydrogen-redox flow battery and to freely flow from the one or more battery cells of the hydrogen-redox flow battery to the hydrogen reservoir. This means the hydrogen is configured to flow between the one or more battery cells and the hydrogen reservoir in an uncontrolled manner. It is thus clear that the pressure in the hydrogen reservoir is allowed to fluctuate in an uncontrolled manner. It is clear that in an uncontrolled manner means that there is no pressure regulating element acting to adapt the actual pressure value in the hydrogen reservoir to a desired pressure value.

In this way, the hydrogen gas and the liquid electrolyte can be stored in these respective reservoirs of the flow battery assembly and can be exchanged with the battery cell in order to generate or capture electricity during a charge or discharge operation. The storage capacity of the battery assembly, which is the total amount of electrical energy that can be stored, depends on the volume of the hydrogen reservoir and of the electrolyte reservoir. The storage capacity of the battery assembly can even be extended by means of the use of replaceable or exchangeable reservoirs. In such a case the flow battery assembly can be recharged simply by re-attaching or exchanging the hydrogen reservoir and/or the electrolyte reservoir with other reservoirs of which the content corresponds to the charged state. The flow of liquid electrolyte from the electrolyte reservoir to the electrolyte inlet and from the electrolyte outlet of the electrolyte chamber back to the electrolyte reservoir creates an electrolyte circuit comprising a circulatory flow of liquid electrolyte between the electrolyte reservoir and the electrolyte chamber. A simple and efficient pump, controlled by a simple control system, can be provided in this electrolyte circuit to provide a suitable flow of the liquid electrolyte, without the need for a complex pressure control system. Alternatively, closed loop thermosiphoning can be used for the circulation of the liquid electrolyte in the battery assembly. Heating the liquid electrolyte triggers a convective movement of the liquid electrolyte in the battery assembly. The heated liquid electrolyte expands and becomes less dense, therefore being more buoyant than the cooler electrolyte at the bottom of the loop in the battery cell. The convection movement of the liquid electrolyte in the battery assembly makes the heated liquid electrolyte circulate upwards in the battery assembly and the heated liquid electrolyte is simultaneously replaced by cooler liquid electrolyte circulating under the effect of gravity. The flow of hydrogen gas could be similarly implemented with a hydrogen circuit comprising a flow from the hydrogen reservoir to the hydrogen inlet and from the hydrogen outlet of the hydrogen chamber back to the hydrogen reservoir, thus creating a circulatory flow of hydrogen gas between the hydrogen reservoir and the hydrogen chamber. A suitable simple pump could be provided in order to provide a certain flow, however also here there is no need for a complex pressure control system. However, according to a particular simple embodiment the hydrogen inlet and hydrogen outlet of the hydrogen chamber coincide and the hydrogen circuit comprises a single exchange path between the hydrogen chamber and the hydrogen reservoir. This is possible as during the charge and discharge operation the mobility of the hydrogen gas between the hydrogen chamber and the hydrogen reservoir is large enough to cause a sufficiently large exchange with the reservoir under the influence of diffusion and/or bulk flow mechanisms acting in the hydrogen circuit. The one or more battery cells of the hydrogen-redox flow battery assembly and the electrolyte reservoir are directly connected to each other. In other words, there is no pressure regulating element implemented between the one or more battery cells of the hydrogen-redox flow battery assembly and the electrolyte reservoir. A pressure regulating element comprises at least one sensor adapted to measure an actual pressure value and at least one active pressure regulator adapted to correct the actual pressure value to a suitable desired pressure value. The electrolyte is therefore allowed to freely flow from the electrolyte reservoir to the one or more battery cells of the hydrogen-redox flow battery and to freely flow from the one or more battery cells of the hydrogen-redox flow battery to the electrolyte reservoir. This means the electrolyte is configured to flow between the one or more battery cells and the electrolyte reservoir in an uncontrolled manner. It is thus clear that the pressure in the electrolyte reservoir is allowed to fluctuate in an uncontrolled manner. It is clear that in an uncontrolled manner means that there is no pressure regulating element acting to adapt the actual pressure value in the electrolyte reservoir to a desired pressure value.

This way, the design of the flow battery assembly is made compact, modular and robust. Additionally this can be accomplished in a way that does not compromise the safety level of such a battery assembly, as the hydrogen circuit does not require any electrically driven components, such as for example a compressor which otherwise need to be located outside the hydrogen reservoir for safety reasons. Additionally the hydrogen reservoir, in order to conform to legal requirements is often the most robust component of the battery assembly and therefor inherently forms a suitable and robust housing protecting for the most delicate parts of battery cell such as for example the membrane.

According to an optional embodiment, the liquid electrolyte comprises a halogen element comprising one or more of the following:
fluorine;
chlorine;
bromine;
iodine;
astatine;
or the liquid electrolyte comprises iron, cerium or vanadium.

In this way, a flow battery assembly can rely on a hydrogen-halogen based chemical reaction, or on a hydrogen-iron based chemical reaction, or on a hydrogen-cerium based chemical reaction, or on a hydrogen-vanadium based chemical reaction, or on any other suitable hydrogen-redox based chemical reaction. Hydrogen-Bromine is for example advantageous as Bromine is largely available, simple to produce and relatively inexpensive.

According to an optional embodiment:
the hydrogen chamber and the hydrogen reservoir are directly coupled to each other without a pressure regulating element such that said pressure in the hydrogen chamber and the pressure in the hydrogen reservoir are allowed to fluctuate in an uncontrolled manner; and/or
the electrolyte chamber and the electrolyte reservoir are directly coupled to each other without a pressure regulating element such that the pressure in the electrolyte chamber and the pressure in the electrolyte reservoir are allowed to fluctuate in an uncontrolled manner.

The one or more battery cells of the hydrogen-redox flow battery assembly and the hydrogen reservoir are directly connected to each other. In other words, there is no pressure regulating element implemented between the one or more battery cells of the hydrogen-redox flow battery assembly and the hydrogen reservoir. A pressure regulating element comprises at least one sensor adapted to measure an actual pressure value and at least one active pressure regulator adapted to correct the actual pressure value to a suitable desired pressure value. Hydrogen is therefore allowed to freely flow from the hydrogen reservoir to the one or more battery cells of the hydrogen-redox flow battery and to freely flow from the one or more battery cells of the hydrogen-redox flow battery to the hydrogen reservoir. This means the hydrogen is configured to flow between the one or more battery cells and the hydrogen reservoir in an uncontrolled manner. It is thus clear that the pressure in the hydrogen chamber is allowed to fluctuate in an uncontrolled manner and that the pressure in the hydrogen reservoir is allowed to fluctuate in an uncontrolled manner. It is clear that in an uncontrolled manner means that there is no pressure regulating element acting to adapt the actual pressure value in the hydrogen chamber to a desired pressure value and that there is no pressure regulating element acting to adapt the actual pressure value in the hydrogen reservoir to a desired pressure value. The one or more battery cells of the hydrogen-redox flow battery assembly and the electrolyte reservoir are directly connected to each other. In other words, there is no pressure regulating element implemented between the one or more battery cells of the hydrogen-redox flow battery assembly and the electrolyte reservoir. The electrolyte is therefore allowed to freely flow from the electrolyte reservoir to the one or more battery cells of the hydrogen-redox flow battery and to freely flow from the one or more battery cells of the hydrogen-redox flow battery to the electrolyte reservoir. This means the electrolyte is configured to flow between the one or more battery cells and the electrolyte reservoir in an uncontrolled manner. It is thus clear that the pressure in the hydrogen chamber is allowed to fluctuate in an uncontrolled manner and that the pressure in the electrolyte reservoir is allowed to fluctuate in an uncontrolled manner. It is clear that in an uncontrolled manner means that there is no pressure regulating element acting to adapt the actual pressure value in the electrolyte chamber to a desired pressure value and that there is no pressure regulating element acting to adapt the actual pressure value in the electrolyte reservoir to a desired pressure value.

According to an optional embodiment, the hydrogen-redox flow battery assembly is further configured to allow an uncontrolled pressure difference between the hydrogen reservoir and the electrolyte reservoir, wherein the pressure difference is determined by the diffusion of protons through the membrane electrode assembly during a charge and/or a discharge operation.

It is clear that in this way the flow battery assembly is configured to allow an uncontrolled pressure difference between the hydrogen reservoir and the electrolyte reservoir. The difference in pressure between the electrolyte reservoir and the hydrogen reservoir is only determined by the chemical reaction in the battery cell, i.e. by the diffusion of protons during a charge and/or a discharge operation. This way, the flow battery assembly does not require the implementation of a complex pressure control system comprising for example high speed pressure sensors, compressors, expanders, pressure controllers or high speed proportional control valves, to maintain a predetermined pressure difference between the hydrogen reservoir and the electrolyte reservoir. This makes the design and the use of the flow battery assembly simpler, more reliable, more efficient and reduces the implementation and maintenance costs.

According to an optional embodiment, the pressure in the hydrogen chamber is allowed to fluctuate in an uncontrolled manner between a predetermined minimum pressure value when the battery cell is fully discharged and a predetermined maximum pressure value when the battery cell is fully charged.

In this way, the pressure in the hydrogen chamber is determined by the diffusion of protons through the membrane electrode assembly during a charge and/or a discharge operation of the flow battery assembly. The pressure in the hydrogen chamber is allowed to fluctuate in an uncontrolled manner, i.e. freely, between a predetermined minimum pressure value when the flow battery assembly is fully discharged and a predetermined maximum pressure value when the flow battery assembly is fully charged. No hydrogen compressor is necessary in the design of the flow battery assembly, which makes the implementation of the flow battery assembly simpler, more efficient, safer and cheaper.

According to an optional embodiment, the pressure in the electrolyte chamber is allowed to fluctuate in an uncontrolled manner between a predetermined minimum pressure value when the battery cell is fully discharged and a predetermined maximum pressure value when the battery cell is fully charged.

In this way, the pressure in the electrolyte chamber is determined by the diffusion of protons through the membrane electrode assembly during a charge and/or a discharge operation of the flow battery assembly. The pressure in the electrolyte chamber and the electrolyte reservoir is also substantially uniform. The pressure in the electrolyte chamber is allowed to fluctuate in an uncontrolled manner, i.e. freely, between a predetermined minimum pressure value when the flow battery assembly is fully discharged and a predetermined maximum pressure value when the flow battery assembly is fully charged. However, it should be clear that these fluctuations in the pressure of the liquid electrolyte are much smaller than the fluctuations in the pressure of the hydrogen gas. A complicated pressure control system of with high speed pressure sensors, proportional control valves, complex controllable compressors, etc, does not need to be implemented in the electrolyte flow circuit between the electrolyte chamber and the electrolyte reservoir to maintain a predetermined pressure difference between the hydrogen chamber and the electrolyte chamber, which makes the design of the flow battery simpler, more robust, more efficient and reduces the cost. The electrolyte chamber of the hydrogen-redox flow battery assembly and the electrolyte reservoir are directly connected to each other. In other words, there is no pressure regulating element implemented between the electrolyte chamber of the hydrogen-redox flow battery assembly and the electrolyte reservoir. A pressure regulating element comprises at least one sensor adapted to measure an actual pressure value and at least one active pressure regulator adapted to correct the actual pressure value to a suitable desired pressure value. The electrolyte is therefore allowed to freely flow from the electrolyte reservoir to the electrolyte chamber of the hydrogen-redox flow battery and to freely flow from the electrolyte chamber of the hydrogen-redox flow battery to the electrolyte reservoir. This means the electrolyte is configured to flow between the electrolyte chamber and the electrolyte reservoir in an uncontrolled manner. It is thus clear that the pressure in the electrolyte chamber is allowed to fluctuate in an uncontrolled manner. It is clear that in an uncontrolled manner means that there is no pressure regulating element acting to adapt the actual pressure value in the electrolyte chamber to a desired pressure value.

According to an optional embodiment, the predetermined minimum pressure value and the predetermined maximum pressure value can fluctuate between 1.1 and 800 bar, preferably between 5 and 150 bar.

In this way, the pressure difference between the hydrogen chamber and the electrolyte chamber can reach several hundreds of bars. No hydrogen compressor is therefore needed between the hydrogen reservoir and the hydrogen chamber to compress the hydrogen. The design of the flow battery assembly is therefore made simpler, more efficient and less expensive.

According to an optional embodiment, each battery cell further comprises:
- a planar membrane extending along a central plane and comprising a hydrogen surface positioned on one side of the central plane and an electrolyte surface positioned on the opposite side of the central plane, the planar membrane configured to only allow the diffusion of protons;
- a hydrogen diffusion layer comprising a membrane side and an opposite hydrogen side and configured to cover the hydrogen surface with its membrane side;
- the hydrogen electrode further comprising a hydrogen electrode contact surface configured to partially cover the hydrogen side of the hydrogen diffusion layer;
- the flow path of the hydrogen gas comprises a hydrogen flow path contact surface configured to partially cover the hydrogen side of the hydrogen diffusion layer;
- an electrolyte diffusion layer comprising a membrane side and an opposite electrolyte side and configured to cover the electrolyte surface with its membrane side;

the electrolyte electrode further comprising an electrolyte electrode contact surface configured to partially cover the electrolyte side of the electrolyte diffusion layer; and the flow path of the liquid electrolyte comprises an electrolyte flow path contact surface configured to partially cover the electrolyte side of the electrolyte diffusion layer.

Each battery cell of the flow battery assembly comprises a stack of a hydrogen electrode, a hydrogen diffusion layer, a membrane, an electrolyte diffusion layer and an electrolyte electrode. The reduction or oxidation reactions at the hydrogen electrode and at the electrolyte electrode result in the generation or the consumption of protons. The membrane blocks the transport of particles other than protons, for example using a size difference between the protons and larger particles. This way, the hydrogen gas and the liquid electrolyte are never in direct contact, which makes the flow battery assembly safe, reliable and efficient.

According to an optional embodiment, each battery cell further comprises:

a sealing positioned in the area between the hydrogen electrode and the electrolyte electrode which is not occupied by the planar membrane and/or the hydrogen diffusion layer and/or the electrolyte diffusion layer, to isolate the hydrogen chamber from the electrolyte chamber.

The sealing isolates the hydrogen chamber from the electrolyte chamber, wherever the membrane, and/or the hydrogen diffusion layer and/or the electrolyte diffusion layer are not present. This way, the hydrogen gas and the liquid electrolyte are never in direct contact with each other, which makes the flow battery assembly safe, reliable and efficient. Even when a large pressure difference is present between the hydrogen chamber and the electrolyte chamber in the fully charged state, leakage is prevented thus increasing the storage efficiency.

According to an optional embodiment, the electrolyte electrode further comprises a mechanical support made of a material with a value of yield strength larger than a predetermined yield strength threshold such that a maximum allowable deformation of the membrane can be guaranteed when in the fully charged state, the mechanical support comprising the electrolyte electrode contact surface and housing the electrolyte flow path contact surface.

The membrane will exert a force in the direction of the electrolyte electrode under the force generated by a large pressure difference between the hydrogen chamber and the electrolyte chamber. The mechanical support is made out of a material with a suitable compression stiffness to withstand the ranges of the pressure difference between the hydrogen chamber and the electrolyte chamber. Preferably the electrolyte electrode thus comprises a hybrid construction comprising for example a suitable metal to provide the required mechanical strength and for example graphite to guarantee a high electrical and thermal conductivity. The electrolyte electrode of the flow battery assembly is therefore made more robust, without jeopardizing its electrical and thermal properties.

According to an optional embodiment, the predetermined yield strength threshold is larger than 30 MPa.

This way, the electrolyte electrode of the flow battery assembly is made more robust as the material of the electrolyte electrode can withstand a pressure difference between the hydrogen chamber and the electrolyte chamber of up to several hundreds of bars.

According to an optional embodiment, the mechanical support comprises:

a membrane support surface in contact with the electrolyte diffusion layer and comprising the electrolyte electrode contact surface;

an opposite support surface housing the electrolyte flow in the form of an electrolyte inlet channel and an electrolyte outlet channel both extending into the mechanical support from the opposite support surface;

feed-through holes extending through the mechanical support from the electrolyte inlet channel and the electrolyte outlet channel to the membrane support surface, thereby forming the electrolyte flow path contact surface.

In this way, the mechanical support of the electrolyte electrode of the flow battery assembly comprises an inlet channel and an outlet channel for the liquid electrolyte on one side, and feed-through holes extending from these inlet and outlet channels to the opposite side of the mechanical support. This way, the liquid electrolyte follows the inlet channel and flow through a first pattern of feed-through holes to reach the electrolyte diffusion layer. After reaching the electrolyte diffusion layer, the liquid electrolyte flows back through a second pattern of feed-through holes and through the outlet channel back to the electrolyte reservoir. This allows for a simple construction of the mechanical support allowing for an optimal electrolyte flow to and from the electrolyte chamber near the membrane.

According to an optional embodiment, the electrolyte inlet channel and the electrolyte outlet channel form an interdigitated flow path for the liquid electrolyte.

This way, the liquid electrolyte is uniformly distributed over the electrolyte electrode contact surface.

According to an optional embodiment, the battery cell is configured such that the electrolyte electrode contact surface is larger than the electrolyte flow path contact surface, preferably the electrolyte electrode contact surface is 80% or more of the membrane support surface.

The electrolyte electrode contact surface is the surface on which the liquid electrolyte reacts according to the half-cell chemical reaction involving the liquid electrolyte. It is clear that in this way, the electrolyte electrode contact surface is maximized. This increases the efficiency of the chemical reaction and therefore increases the overall efficiency of the flow battery assembly. Additionally, in this way, the force generated by the pressure difference between the hydrogen chamber and the electrolyte chamber on the planar membrane is distributed on a larger surface such that the local stress on the electrolyte electrode contact surface is reduced.

According to an optional embodiment, wherein the hydrogen-redox flow battery assembly comprises a plurality of battery cells and the hydrogen electrode of at least one of said battery cells is coupled to the electrolyte electrode of a next one of the battery cells.

In this way, the flow battery assembly can comprise several battery cells similar to the one described above. The electric power generated by a plurality of battery cells is higher than the electric power generated by a single battery cell. The hydrogen electrode of at least one of the battery cells is coupled to the electrolyte electrode of an adjacent battery cell. This way, several battery cells of the flow battery assembly can be mounted in series.

According to an optional embodiment, the hydrogen electrode and the electrolyte electrode of the coupled battery cells are formed as a single unit.

This way, several battery cells can be cascaded. The design of the flow battery is therefore more compact, simpler and less-demanding in terms of space. Additionally the efficiency of the flow battery assembly is increased as there are no electrical connection losses between the electrodes of adjacent cells.

According to an optional embodiment, the hydrogen-redox flow battery assembly further comprises:
- flanges in between which the plurality of battery cells are stacked along a longitudinal axis; and
- fasteners configured to cooperate with the flanges such that the battery cells are secured in between the flanges.

This way, the plurality of battery cells is reliably secured together in a simple way allowing the collection of the generated electric power at both extremities of the stack, which makes the use of the flow battery assembly inherently safe, reliable and simple. The flow of hydrogen gas and liquid electrolyte are also isolated from each other, which makes the flow battery assembly safe and reliable.

According to an optional embodiment, the electrolyte reservoir of the hydrogen-redox flow battery assembly is completely positioned in the hydrogen reservoir.

This way, the design of the flow battery assembly is made compact, modular and robust. Additionally this ensures the safety level of such a battery assembly as the resulting flowing circuit of the hydrogen-redox flow battery assembly forms an isolated circuit. Contrary to a fuel cell it is possible to completely position the electrolyte reservoir in the hydrogen reservoir without risking a reaction between hydrogen and oxygen which would jeopardize the safety and the integrity of a user of the hydrogen-redox flow battery assembly.

According to a second aspect of the invention, there is provided a method of operating a hydrogen-redox flow battery assembly according to the first aspect of the invention
Characterized in that
- the hydrogen-redox flow battery assembly allows an uncontrolled pressure difference between the pressure in the hydrogen chamber of the battery cell and the pressure in the electrolyte chamber of the battery cell, wherein the pressure difference is determined by the diffusion of protons through the membrane electrode assembly during a charge and/or a discharge operation; and
- the one or more battery cells of the hydrogen-redox flow battery assembly is/are completely positioned in the hydrogen reservoir.

DETAILED DESCRIPTION OF EMBODIMENT(S)

Figure 1:
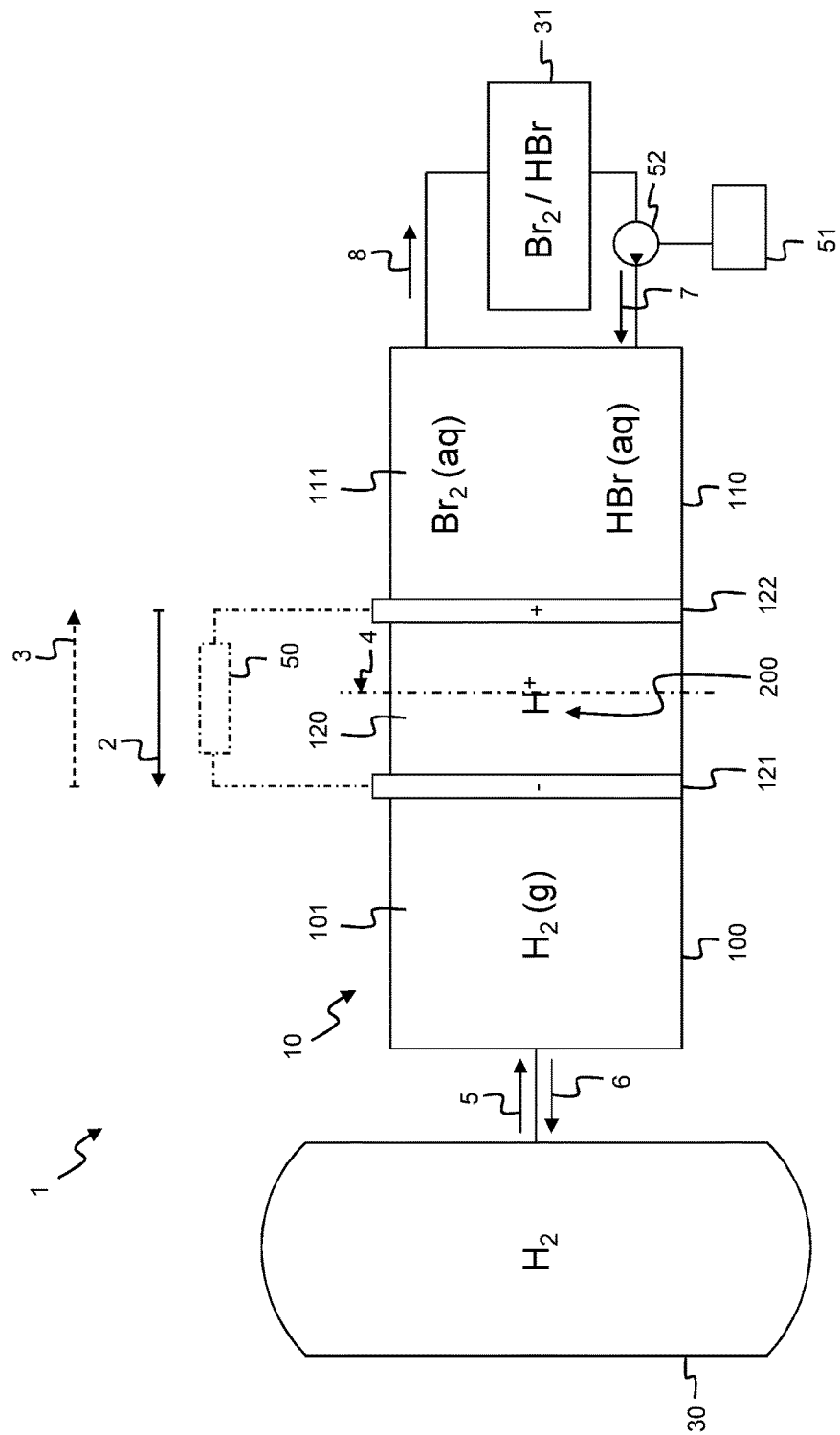
FIG. 1 schematically illustrates an embodiment of a flow battery assembly for generation and storage of electric power.

According to an embodiment shown in FIG. 1, a flow battery assembly 1 comprises a battery cell 10 comprising a hydrogen chamber 100, an electrolyte chamber 110. In between the hydrogen chamber 100 and the electrolyte chamber 110 there is positioned a membrane 123 of a membrane electrode assembly 120 which further comprises a hydrogen electrode 121 and an electrolyte electrode 122. In an alternative embodiment, the flow battery assembly 1 comprises a plurality of battery cells 10 similar to the battery cell 10 depicted in FIG. 1, as will be explained in further detail below with reference to the embodiment of FIG. 5. As shown, the planar membrane 123 comprises a central plane 4. The hydrogen electrode 121 is positioned on one side of the central plane 4 and the electrolyte electrode 122 is positioned on the opposite side of the central plane 4. As shown the hydrogen electrode 121 is positioned at the same side of the central plane 4 as the hydrogen chamber 100; while the electrolyte electrode 122 and the electrolyte chamber 110 are both positioned at the opposite side of the central plane 4.

As further shown in FIG. 1 a hydrogen reservoir 30 is connected to the hydrogen chamber 100 of the flow battery assembly 1 and is configured to retain hydrogen gas 101. As shown, there could be provided a single connection between the hydrogen chamber 100 and the hydrogen reservoir 30, for example in the form of suitable tube, line, pipe, connector, etc., which allows for an inlet flow 5 of hydrogen gas into the hydrogen chamber 100 from the hydrogen reservoir 30 and an outlet flow 6 of hydrogen gas out of the hydrogen chamber 100 to the hydrogen reservoir 30. However according to alternative embodiments, as will for example be explained in more detail with reference to FIG. 2, the hydrogen chamber 100 is configured to house a flow path of hydrogen gas 101 between a separate hydrogen inlet 5 and a hydrogen outlet 6. An electrolyte reservoir 31 is connected to the electrolyte chamber 110 of the flow battery assembly 1. As shown in FIG. 1, two connections are provided between the electrolyte reservoir 31 and the electrolyte chamber 110, for example in the form of suitable tubes, lines, pipes, connectors, etc., which allows for an inlet flow 7 of liquid halogen electrolyte 111 into the electrolyte chamber 110 from the electrolyte reservoir 31 and an outlet flow 8 of liquid halogen electrolyte 111 out of the electrolyte chamber 110 to the electrolyte reservoir 110. The electrolyte chamber 110 is thus configured to house a flow path of liquid halogen electrolyte 111 between an electrolyte inlet 7 and an electrolyte outlet 8.

The liquid halogen electrolyte 111 comprises a halogen element, or a mixture of halogen elements. The halogen element is preferably bromine, for example in solution with a 1 mol·L$^{-1}$ volume concentration, which results in a liquid halogen electrolyte 111 which comprises an aqueous solution of hydrogen bromide/bromine. In an alternative embodiment, the electrolyte comprises for example fluorine, chlorine, bromine, iodine, astatine, etc., or a mixture of such halogen elements. The formation of tribromide ion in the presence of bromine and bromide is given by equation (A):

$$Br_2 + Br^- \rightleftharpoons Br_3^- \tag{A}$$

Given the favourable formation of tribromide (and higher polybromide species) under most operating conditions, a liquid halogen electrolyte 111 comprising aqueous HBr ou HBr/Br$_2$ could thus also comprise a mixture of HBr, Br$_3^-$, and Br$_2$.

The hydrogen electrode 121 of the membrane electrode assembly 120 is connected to the hydrogen chamber 100 and the electrolyte electrode 122 is connected to the electrolyte chamber 110. The potential difference between the electrolyte electrode 122 and the hydrogen electrode 121 can be applied to an electrical load 50, as shown in FIG. 1. The membrane electrode assembly 120 is configured to only allow a diffusion of protons 200 through the membrane electrode assembly 120 between the hydrogen gas 101 in the hydrogen chamber 100 and the liquid halogen electrolyte 111 is the electrolyte chamber 110.

The flow battery assembly 1 relies on the same battery cell 10 for storing and generating electric power, during a charge operation 2 and a discharge operation 3 of the flow battery assembly 1. During a charge operation 2 of the hydrogen-bromine flow battery assembly 1, a stabilized solution of bromine (Br$_2$) and hydrogen bromide (HBr) in water is provided to the positive electrode 122, for example by a pump 52. As shown in FIG. 1, a pump 52 is positioned between the electrolyte reservoir 31 and the inlet 7 of electrolyte chamber 110, in order to provide an inlet flow 7 of halogen electrolyte from the electrolyte reservoir 31 into the electrolyte chamber 110 and thereby generating a corresponding outlet flow 8 from the outlet 8 of the electrolyte chamber 110 back to the electrolyte reservoir. The electrolyte solution 111 can for example be pumped through the flow battery assembly 1 with a constant or variable flow direction and flow. This ensures that new and fresh liquid halogen electrolyte 111 from the electrolyte reservoir 31 is provided to the electrolyte chamber 110 when necessary. During a charge operation 2 or discharge operation 3 of the flow battery assembly 1, a liquid halogen electrolyte 111 with molar concentration of between 0.1 mol·L$^{-1}$ and 1.8 mol·L$^{-1}$ of Br$_2$ and between 0.2 mol·L$^{-1}$ and 7.0 mol·L$^{-1}$ of HBr is preferably present in the electrolyte chamber 110 and at the electrolyte electrode 111 to ensure an optimal charging operation 2. As will be explained in further detail below, because of the electrochemical reaction in the electrolyte chamber 110, during a charge operation the molar concentration of Br$_2$ will increase and the molar concentration of HBr will decrease in the electrolyte chamber 110, while during a discharge operation the molar concentration of Br$_2$ will decrease and the molar concentration of HBr will increase in the electrolyte chamber 110. However, the circulation of liquid halogen electrolyte 111 through the electrolyte inlet 7 and the electrolyte outlet 8 creates a circulation loop of liquid halogen electrolyte 111 between the electrolyte reservoir 31 and the electrolyte chamber 110. As the volume of the electrolyte reservoir 31 is at least 10 times larger than the volume of the electrolyte chamber 110 and fresh halogen electrolyte 111 is continuously circulated from the electrolyte reservoir 31 through the electrolyte chamber 110 by means of the pump, any changes in the molar concentrations mentioned above will be divided by at least a factor 10 as these will be diluted across the overall volume of the electrolyte reservoir 31. According to a particular embodiment the volume of an electrolyte chamber 110 of a battery cell 10 is for example 1 cm$^3$ and the volume of a connected electrolyte reservoir reservoir 31 is for example 10 cm$^3$.

As shown in FIG. 1, the pump 52 is for example controlled by a programmable controller 51. The programmable controller 51 can be any suitable controller device, such as a computer or microprocessor, and preferably contains logic circuitry which decides how to operate pump 52 or other suitable flow control elements such as for example valves, circulation loops in the electrolyte chamber 110, etc. It is clear that the circuit for the flow of liquid halogen electrolyte 111 may optionally comprise one or more valves, additional reservoirs, sensors, monitors, or a combination of thereof. Parameters, measured by suitable sensors, such as the value of the potential difference between the electrolyte electrode 122 and the hydrogen electrode 121, the concentration of bromine at the electrolyte electrode 122 and in the electrolyte chamber 110, etc., can be taken into account by the programmable controller 51 when controlling the pump 52 or any of the other flow control elements. According to alternative embodiments the electrolyte reservoir 31 could be directly connected to the electrolyte chamber 110 through an electrolyte inlet 7 and through an electrolyte outlet 8. The liquid halogen electrolyte 111 then flows to the electrolyte electrode 122 of the electrolyte chamber 110.

The general electrochemical operation principle of the flow battery assembly 1 can be described with respect to a charge 2 and a discharge operation 3. The relevant charge 2/discharge 3 reactions are described by equation (R).

$$H_2(g) + Br_2(aq) \underset{\text{Charging [Ox'n]}}{\overset{\text{Discharging [Red'n]}}{\rightleftharpoons}} 2HBr(aq) \tag{R}$$

$$E^0 = 1.098 \text{ V}$$

where H$_2$ (g) is hydrogen gas 101, Br$_2$ (aq) is bromine in an aqueous solution, HBr (aq) is an aqueous solution of hydrogen bromide, and E$^0$ is the standard potential of the Br$_2$/Br$^-$ electrode (1.098V vs. the Standard Hydrogen Electrode, also referred to as SHE). These reactions can also be described in terms of the half-cell reaction (P) at the electrolyte electrode 122 and the half-cell reaction (N) at the hydrogen electrode 121:

$$Br_2(aq) + 2e^- \underset{\text{Charging [Ox'n]}}{\overset{\text{Discharging [Red'n]}}{\rightleftharpoons}} 2Br^-(aq) \tag{P}$$

$$E^0 = 1.098 \text{ V}$$

where Br$_2$ (aq) is bromine in an aqueous solution, e– is an electron, Br$^-$ is bromide in an aqueous solution, and E$^0$ is the standard potential of the Br$_2$/Br$^-$ electrode (1.098V vs. the Standard Hydrogen Electrode, also referred to as SHE).

$$H_2(g) \underset{\text{Charging [Ox'n]}}{\overset{\text{Discharging [Red'n]}}{\rightleftharpoons}} 2H^+ + 2e^- \tag{N}$$

$$E^0 = 0 \text{ V}$$

where $H_2$ (g) is hydrogen gas 101, $e^-$ is an electron, and $H^+$ is a proton.

During a charge operation 2, the liquid halogen electrolyte 111 is for example pumped or exchanged in any other suitable way between the electrolyte reservoir 31 and the electrolyte chamber 110 through an electrolyte inlet 7. The bromide is therein oxidized to bromine according to the backwards reaction (P). Charged electrolyte 111 is then removed from the electrolyte chamber 110 through an electrolyte outlet 8, and returned to the electrolyte reservoir 31 or to another reservoir. During the same charge operation 2, hydrogen is produced at the hydrogen electrode 121 in the hydrogen chamber 100 of the battery cell 10 according to the backwards reaction (N). During a discharge operation 3, the liquid halogen electrolyte 111 flows in the electrolyte chamber 110 from the electrolyte reservoir 31 to the electrolyte electrode 122, where bromine is therein reduced to bromide, according to the forwards reaction (P). During the same discharge operation 3, hydrogen is provided by the hydrogen reservoir 30 to the hydrogen electrode 121 of the hydrogen chamber 100, where the hydrogen is oxidized to protons according to the forwards reaction (N).

The flow battery assembly comprises two circuits, one for a stabilized electrolyte 111 solution of bromine ($Br_2$) and hydrogen bromide (HBr) in water, and one for hydrogen gas 101. During a charge 2 and a discharge 3 operation, as explained above, the concentrations of bromine ($Br_2$) and hydrogen bromide (HBr) in the liquid electrolyte 111 present in the electrolyte chamber 110 change, just like the pressure of the hydrogen gas 101 present in the hydrogen chamber 100 changes. The flow battery assembly 1 is configured to allow an uncontrolled pressure difference between the pressure in the hydrogen chamber 100 of the battery cell 10 and the electrolyte chamber 110 of the same battery cell 10. During a charge 2 or discharge 3 operation, the pressure difference is determined by the diffusion of the protons 200 through the membrane electrode assembly 120 of the battery cell 10. In other words, the pressure difference between the electrolyte and the hydrogen chamber is only determined by the chemical reaction inside the battery cell 10. The flow battery assembly 1 is also configured to allow an uncontrolled pressure difference between the hydrogen reservoir 30 and the electrolyte reservoir 31. In other words, the pressure in the electrolyte chamber 110 and the electrolyte reservoir 31 is substantially uniform, and the pressure in the hydrogen chamber 100 and the hydrogen reservoir 30 is substantially uniform. The difference in pressure between the electrolyte reservoir 31 and the hydrogen reservoir 30 is only determined by the chemical reaction in the battery cell 10, i.e. by the diffusion of protons 200 during a charge 2 and/or a discharge 3 operation. The pressure in the hydrogen chamber 100 is allowed to fluctuate in an uncontrolled manner between a predetermined minimum pressure value when the flow battery assembly 1 is fully discharged and a predetermined maximum pressure value when the flow battery assembly 1 is fully charged. Also the pressure in the electrolyte chamber 110 is allowed to fluctuate in an uncontrolled manner with respect to the pressure in the electrolyte reservoir 31 and with respect to the pressure in the hydrogen chamber 100, however it should be clear that these fluctuations in the pressure of the halogen electrolyte liquid are much smaller than the fluctuations in the pressure of the hydrogen gas. For example when fully charged the pressure of the hydrogen gas in the hydrogen chamber can reach for example 800 bar, while the pressure in the electrolyte liquid remains below 10 bar in all operational states of the battery cell 10. In this way the predetermined pressure difference between the pressure in the hydrogen chamber 100 and the pressure in the electrolyte chamber 110 can fluctuate for example between 1.1 bar when fully discharged and 800 bar when fully charged, or for example between 5 bar when fully discharged and 150 bar when fully charged. It is clear that still further alternative examples of pressure ranges are possible, as long as in general the pressure difference can fluctuate freely between a predetermined minimum pressure difference which is a plurality of orders of magnitude lower than a predetermined maximum pressure difference.

It is clear that, especially in the fully charged state, as the pressure in the hydrogen chamber 100, for example 500 bar, will be substantially larger than the pressure in the electrolyte chamber 110, for example 3 bar, there will be generated a force resulting from this pressure difference on the membrane 123 in between the hydrogen chamber 100 and the electrolyte chamber 110, this force acting in the direction of the area with the lowest pressure which is the electrolyte chamber 110. As will be explained in further detail with reference to FIG. 2, the membrane electrode assembly is developed to be able to withstand such a high pressure difference between the hydrogen chamber 100 and the electrolyte chamber 110. In this way a simple and robust battery cell assembly is realized which does not require additional elements in the hydrogen circuit in order to compress low pressure hydrogen gas from the hydrogen chamber to high pressure hydrogen gas in the hydrogen reservoir for a more efficient storage, and for expansion of the same high pressure hydrogen gas in the reservoir back to a lower pressure in the hydrogen chamber, which thus clearly simplifies the hydrogen gas circulation circuit. As shown in FIG. 1, this circuit can be even further simplified by providing a single direct connection between the hydrogen chamber 100 and the hydrogen reservoir 30, as diffusion of the hydrogen gas between the hydrogen chamber 100 and the hydrogen reservoir 30 will generate the required exchange of hydrogen gas for an efficient operation of the battery cell.

Figure 2:
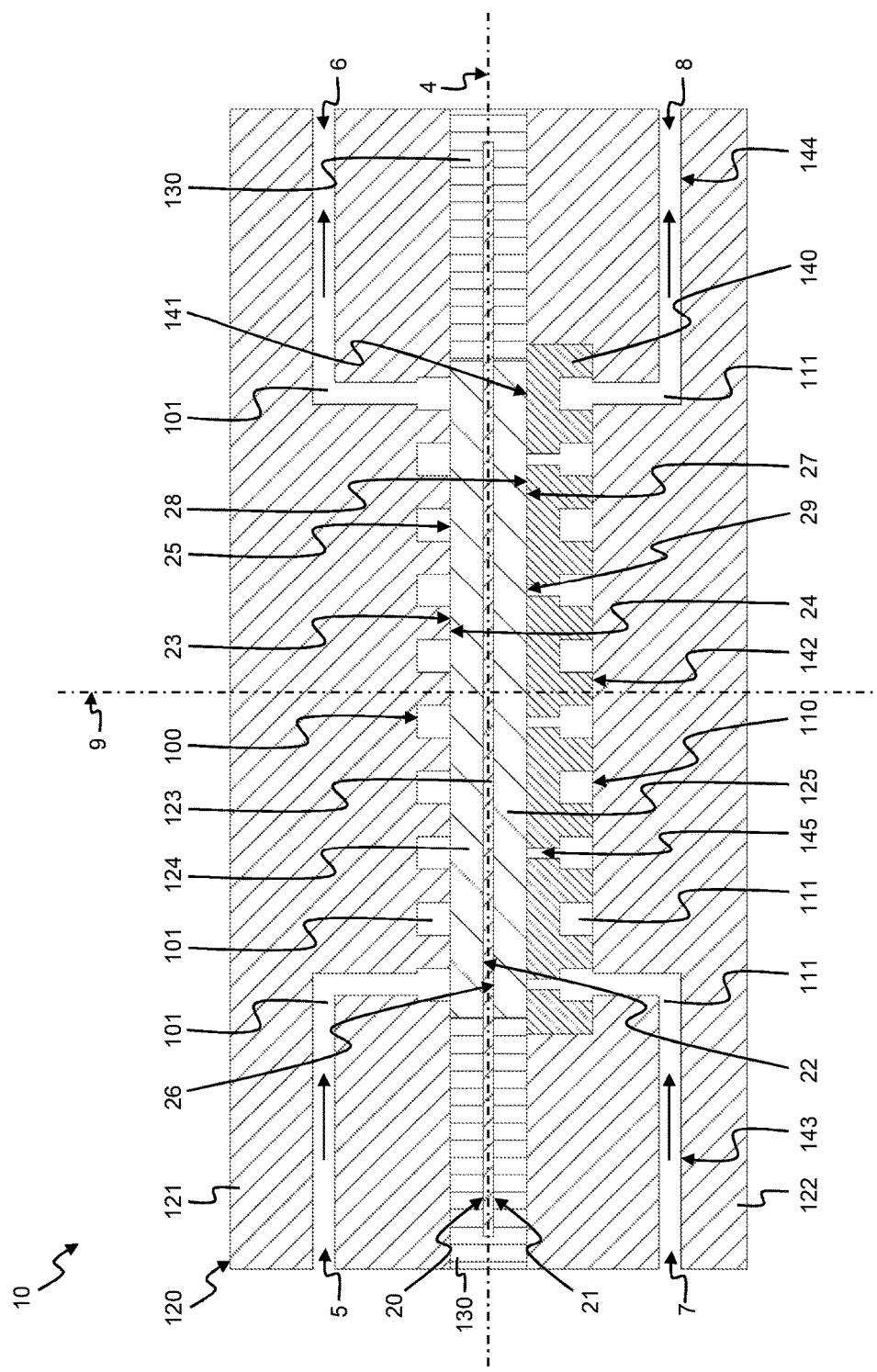
FIG. 2 schematically illustrates an embodiment of a battery cell of a flow battery assembly which comprises a membrane electrode assembly.

According to an embodiment shown in FIG. 2, a battery cell 10 comprises a planar membrane 123, a hydrogen diffusion layer 124, a hydrogen electrode 121, a flow path of hydrogen gas 101, an electrolyte diffusion layer 125, an electrolyte electrode 122, and a flow path of liquid halogen electrolyte 111. The planar membrane 123 extends along a central plane 4 and comprises a hydrogen surface 20 positioned on one side of the central plane 4, and an electrolyte surface 21 positioned on the opposite side of the central plane 4. The planar membrane 123 only allows the diffusion of protons 200 between the hydrogen electrode 121 and the electrolyte electrode 122. The planar membrane 123 is made out of a non-porous polymer, for example copolymers from a polymer backbone and acid functional groups, that are commercially available, such as for example Nafion®, Aciplex®, Hyflon®, Flemion®, Fumapem®. In an alternative embodiment, filler particles with a controlled morphology such as for example zirconium phosphate can be added to the planar membrane 123 to block the transport of particles other than protons 200, using the size difference between protons 200 and larger particles that might diffuse through the planar membrane 123. The planar membrane 123 can have for example a reinforcement to increase the mechanical strength by adding for example chemical crosslinking components, radiation induced crosslinking, a porous matrix or a polymeric fabric. The reinforcement matrices or fabrics should have adequate chemical resistance and are made from materials such as PTFE, polypropylene, polysulfon, polyvinylidene difluoride also referred to as PVDF, polyethylene, glass or carbon. The reinforcement can be in the shape of a porous sheet, an expanded sheet, fibrils, fibers, non-wovens and wovens. On FIG. 2, the battery cell 10 further comprises a hydrogen diffusion layer 124, which comprises a membrane side 22 and an opposite hydrogen side 23. The hydrogen diffusion layer covers the hydrogen surface 20 of the planar membrane 123 with its membrane side 22. The hydrogen electrode 121 further comprises a hydrogen electrode contact surface that partially covers the hydrogen side 23 of the hydrogen diffusion layer 124. The flow path of the hydrogen gas 101 comprises a hydrogen flow path contact surface 25 that partially covers the hydrogen side 23 of the hydrogen diffusion layer 124. On FIG. 2, the battery cell 10 further comprises an electrolyte diffusion layer 125 which comprises a membrane side 26 and an opposite electrolyte side 27. The electrolyte diffusion layer 125 covers the electrolyte surface 21 with its membrane side 26. The electrolyte electrode 121 further comprises an electrolyte electrode contact surface 28 that partially covers the electrolyte side 27 of the electrolyte diffusion layer 125. The flow path of the liquid halogen electrolyte 111 comprises an electrolyte flow path contact surface 29 that partially covers the electrolyte side 27 of the electrolyte diffusion layer 125. The hydrogen diffusion layer 124 and the electrolyte diffusion layer 125 are for example made out of carbon fiber wovens or non-wovens with a binder material. A suitable hydrogen diffusion layer 124 and electrolyte diffusion layer 125 are generally available as for example manufactured by companies such as for example Toray, SGL, Freudenberg and Engineered Fiber Technologies. Suitable materials include for example Toray TGP-H-030, Toray TGP-H-120, SGL Sigracet 10AA, SGL Sigracet 25BC, Freudenberg H2315, Engineered Fiber Technologies Spectracarb 1050 and Engineered Fiber Technologies Spectracarb 6060. Preferably, a suitable hydrogen catalyst layer is deposited to cover the membrane side 22 of the hydrogen diffusion layer 124. The hydrogen catalyst layer preferably includes platinum or a platinum alloy. Preferably, a suitable electrolyte catalyst layer is deposited to cover the membrane side 26 of the electrolyte diffusion layer 124. The hydrogen catalyst layer and the electrolyte catalyst layer include at least one electrochemical catalyst, for example platinum, and/or other precious or non-precious metal or metals. The terms "hydrogen catalyst layer" and "electrolyte catalyst layer" refer to layers of such a catalyst material capable of improving the efficiency of the respective electrochemical conversion, under the appropriate electrochemical conditions.

As visible in FIG. 2, the electrolyte electrode 122 further comprises a mechanical support 140. The mechanical support 140 is made out of an electrically conductive and porous material in order to enable the transport of electrons and of the liquid halogen electrolyte 111 to the electrolyte catalyst layer and to the planar membrane 123. The size of the pores in the porous mechanical support 140 is determined and chosen so as to offer a trade-off between an optimal diffusion of the liquid halogen electrolyte 111 through the mechanical support 140 and the mechanical strength of the mechanical support 140. The hydraulic diameter is for example 0.01 to 5 times the thickness of the planar membrane 123. The planar membrane 123 for example has a thickness in the range of 0.005 mm to 0.500 mm, for example 0.050 mm. A smaller pore diameter is selected for flow battery assemblies 1 operating with a high pressure difference between the hydrogen chamber 100 and the electrolyte chamber 110, for instance several hundreds of bars, in order not to jeopardize the mechanical strength of the mechanical support 140. The mechanical support 140 for example can be made of porous metal such as titanium, tantalum or steel. According to an alternative embodiment, the mechanical support 140 can be made of the combination of a graphite fiber or carbon fiber composite material and a porous metal such as titanium, tantalum or steel. The graphite fiber or carbon fiber composite is preferably 2 to 20 times thinner than the porous metal, and preferably 3 to 10 times softer than the porous metal. According to a further alternative embodiment, the mechanical support 140 can also be made of expanded metal foils or perforated metal foils.

The hydrogen electrode 121 and the electrolyte electrode 122 comprise graphite. The mechanical support 140 comprise a combination of graphite fiber or carbon fiber and a porous metal. The following table summarizes material parameters from literature in the field of material sciences for graphite and for suitable porous metals implemented in an embodiment of the flow battery assembly 1. The Young's modulus of the Tantalum, of the Titanium, and of the steel are estimated to be a third of the value of the Young's modulus for the bulk material. The yield strength or yield point of a material is understood here according to its definition in materials science, i.e. as the stress at which a material begins to deform plastically. Prior to the yield point the material will deform elastically and will return to its original shape when the applied stress is removed. Once the yield point is passed, some fraction of the deformation will be permanent and non-reversible.

|  |  | Graphite | Tantalum | Titanium | Steel |
| --- | --- | --- | --- | --- | --- |
| Young's modulus | GPa | 3 | 62 | 38.9 | 66.7 |
| Yield strength | MPa | 10 | 60 | 33.3 | 173.3 |

Under the force generated by a large pressure difference between the hydrogen chamber 100 and the electrolyte chamber 110, the membrane 123 will exert a force in the direction of the electrolyte electrode 122 as explained above. An electrolyte electrode 122 made of graphite will more easily deform than an electrolyte electrode 122 made of a metal such as Tantalum, Titanium or steel. However the electrical conductivity of such metals is lower than that of Graphite and would thus result in a less efficient battery cell. For this reason, as shown in FIG. 2, preferably the electrolyte electrode 122 comprises a combination of a graphite fiber or carbon fiber composite material and a porous metal such as titanium, tantalum or steel, which form a mechanical support 140 for the membrane 123. In this way the risk for damage of the planar membrane 123 is reduced as it is supported by the mechanical support 140 with a higher Young's modulus and Yield strength, while also the electrical efficiency of the battery cell 10 because of the higher electrical conductivity of for example graphite in the other regions of the electrolyte electrode. This guarantees an efficient transport of electrons in the electrolyte electrode 122, and the presence of graphite fiber or carbon fiber composite material further makes it more resistant to corrosion than if the electrolyte electrode 122 was entirely made out of metal.

Figure 4B:
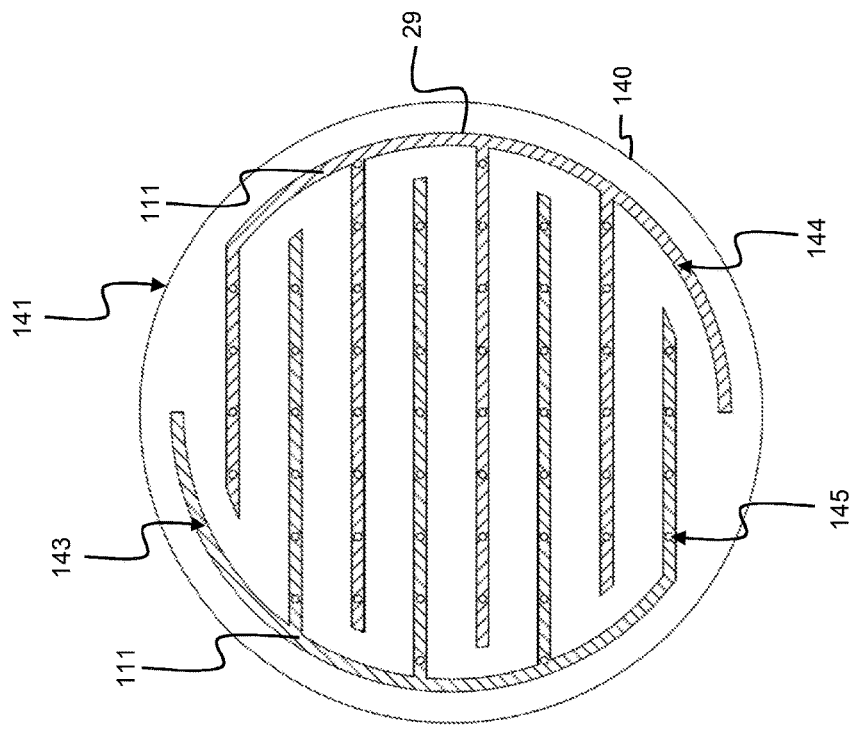
FIG. 4B shows the embodiment of the mechanical support of FIG. 4A viewed from the opposite side.

The mechanical support 140 can be processed with traditional sintering techniques or with layered manufacturing processes such as Direct Metal Laser Sintering. The main advantage of the Direct Metal Laser Sintering process over a conventional sintering process is a greater freedom of design for the design of the mechanical support 140. The process does not require any additional processing step to incorporate pores of different dimensions or shapes, or inlet or outlet channels as visible in FIG. 4B in the mechanical support 140. This ensures the process stays simple, compared to a traditional sintering process.

It is clear that further alternative embodiments of the mechanical support 140 are possible as long as in general the mechanical support 140 is made of a material with a value of yield strength larger than a predetermined yield strength threshold such that a maximum allowable deformation of the membrane can be guaranteed when in the fully charged state. Typically this predetermined yield strength threshold is larger than 30 MPa.

As visible in FIG. 2, the membrane support surface of the mechanical support 140 is in direct contact with the electrolyte diffusion layer 125. According to an alternative embodiment, a layer of graphite paper or any other suitable electrically conductive material can be positioned between the electrolyte diffusion layer 125 and the mechanical support 140. This additional layer increases the electrical conductivity in the vicinity of the planar membrane 123. According to still a further embodiment, the mechanical support 140 could be encapsulated into the graphite material of the electrolyte electrode 122.

As visible in FIG. 2, the battery cell 10 further comprises a sealing 130 positioned in the area between the hydrogen electrode 121 and the electrolyte electrode 122 which is not occupied by the planar membrane 123 and/or the hydrogen diffusion layer 124 and/or the electrolyte diffusion layer 125. The sealing 130 is present to prevent the hydrogen gas 101 and the liquid halogen electrolyte 111 to be in direct contact with each other. The sealing 130 is a polymeric film made out of for example polyethene, polyfenylenesulfide or polytetrafluoroethylene. According to an alternative embodiment, a metal foil or a rubber, such as for example ethylene propylene diene monomer (EPDM) or chlorotrifluoroethylenevinylidene fluoride (FKM) or fluorocarbon, can be used to seal the battery cell 10. The polymeric, metal or rubber foils are preferably connected to the membrane electrode assembly 120 through a lamination process. Several materials can be used during the lamination process, such as for example adhesive layers, thermoplastic polymers, resins or cross-linking films. According to an alternative embodiment, the lamination process is replaced by an injection molding process in order to mold a sealing area on the outer perimeter of the membrane electrode assembly 120, outside the electrochemically active area. According to a further alternative embodiment, the injection molding process is replaced by a transfer-molding process. As visible in FIG. 2, the sealing 130 comprises a gasket that is flat. According to an alternative embodiment, the sealing 130 presents a gasket which has local thickenings, that can be located around the feed-through holes 145, and that can have a square or semi-circular cross-section, or any other shape.

Figure 3:
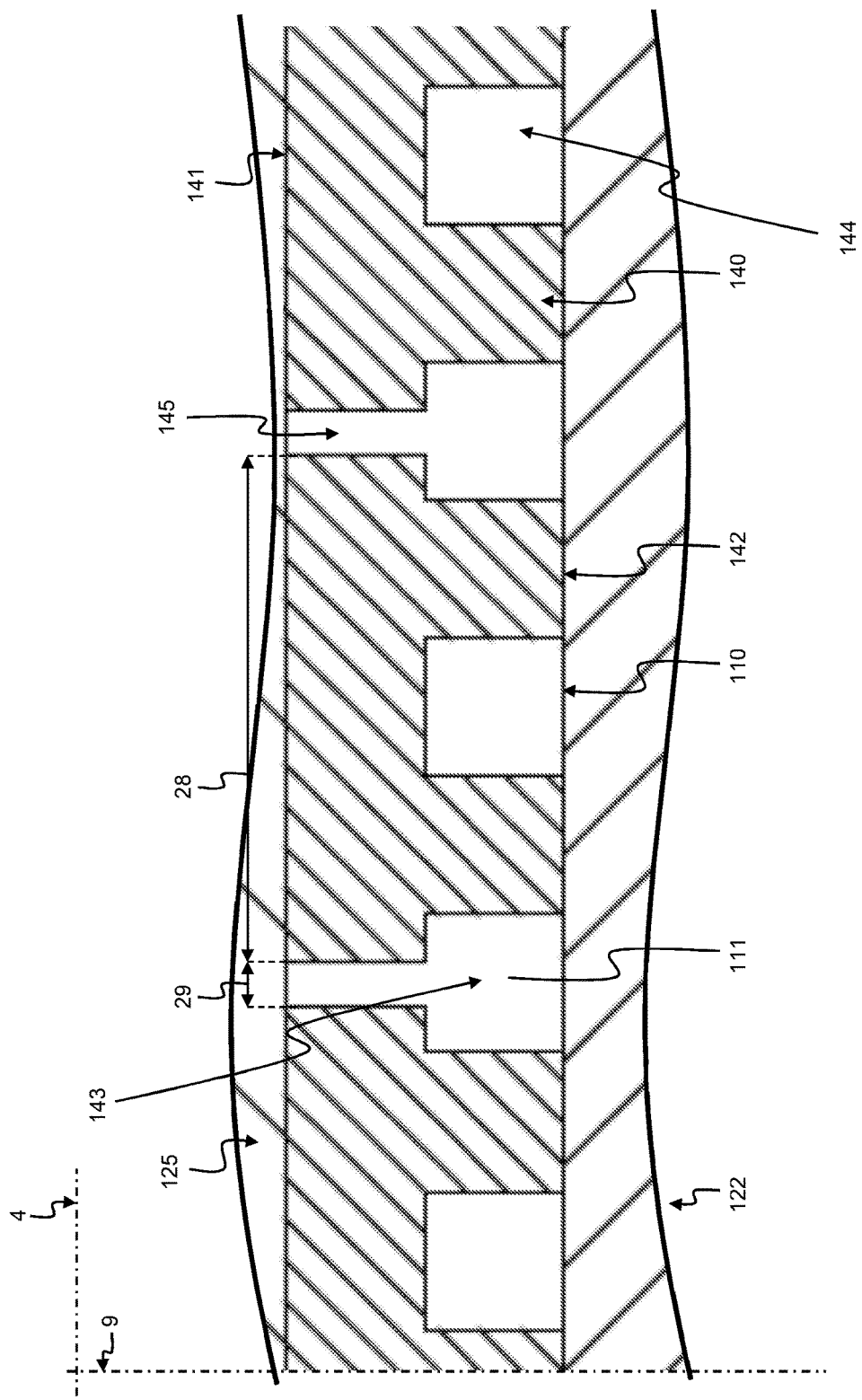
FIG. 3 schematically illustrates a section of the electrolyte chamber and the mechanical support of an electrolyte electrode of the embodiment of FIG. 2.

FIG. 3 schematically illustrates a section of the electrolyte chamber 110 and the mechanical support 140 of an electrolyte electrode 122 of the embodiment of FIG. 2. Components having identical reference numbers to components in FIG. 2 perform the same function. The mechanical support 140 comprises a membrane support surface 141 in contact with the electrolyte diffusion layer 125 and comprising an electrolyte electrode contact surface 28. The mechanical support 140 further comprises an opposite support surface 142 housing the electrolyte 111 flow in the form of an electrolyte inlet channel 143 and an electrolyte outlet channel 144 both extending into the mechanical support 140 from the opposite support surface 142. The mechanical support 140 comprises feed-through holes 145 extending through the mechanical support 140 from the electrolyte inlet channel 143 and the electrolyte outlet channel 144 to the membrane support surface 141, thereby forming the electrolyte flow path contact surface 29. The electrolyte electrode contact surface 28 is larger than the electrolyte flow path contact surface 29. For example, the electrolyte electrode contact surface 29 corresponds to preferably 80% or more of the surface of the membrane support surface 141. The feed-through holes 145 have a diameter of 0.01 to 2 mm, and preferably from 0.1 to 0.3 mm. As visible in FIG. 3, the feed-through holes can be positioned periodically along the membrane support surface 141, but according to an alternative embodiment, the feed-through holes 145 can be non-periodically distributed on the membrane support surface 141.

Figure 4A:
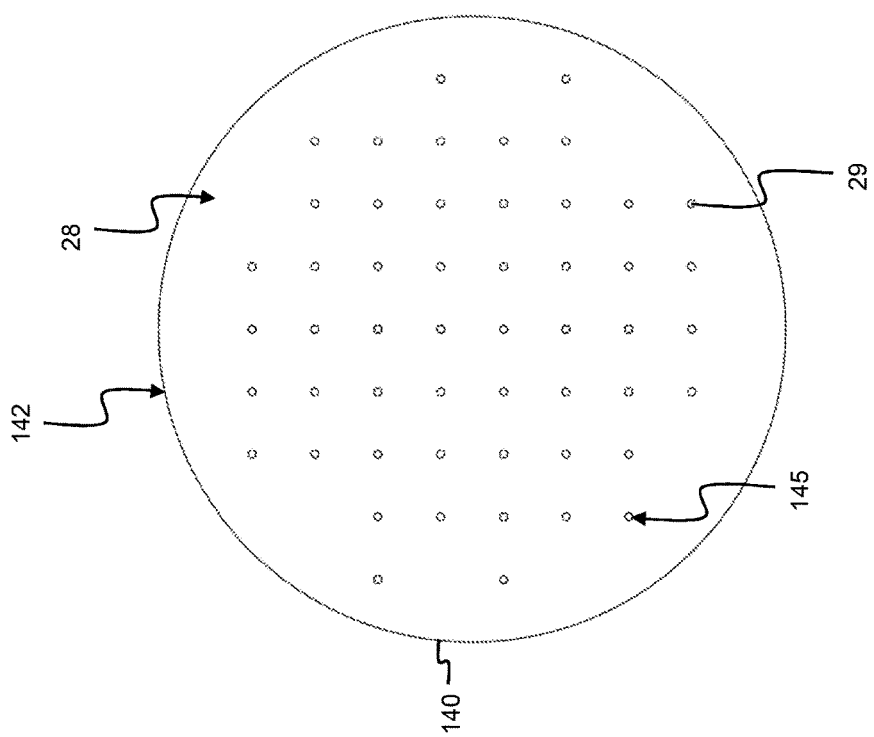
FIG. 4A schematically illustrates an embodiment of a mechanical support for an electrolyte electrode viewed from the membrane side.

According to an embodiment shown in FIG. 4, the mechanical support 140 comprises a membrane support surface 141 which is substantially flat and an electrolyte electrode contact surface 28 on the opposite side, which comprises two channels. The mechanical support 140 further comprises an opposite support surface 142 housing the electrolyte 111 flow in the form of an electrolyte inlet channel 143 and an electrolyte outlet channel 144 both extending into the mechanical support 140 from the opposite support surface 142. The mechanical support 140 comprises feed-through holes 145 extending through the mechanical support 140 from the electrolyte inlet channel 143 and the electrolyte outlet channel 144 to the membrane support surface 141, thereby forming the electrolyte flow path contact surface 29. The feed-through holes 145 have a diameter of 0.01 to 2 mm, and preferably from 0.1 to 0.3 mm. As visible in FIG. 3, the feed-through holes can be positioned periodically along the membrane support surface 141, but according to an alternative embodiment, the feed-through holes 145 can be non-periodically distributed on the membrane support surface 141. The electrolyte inlet channel 143 and the electrolyte outlet channel 144 form an interdigitated flow path for the liquid halogen electrolyte 111. The two channels ensure a uniform macro distribution of the liquid halogen electrolyte 111 over the active opposite electrolyte side 27 of the electrolyte diffusion layer 125. After flowing through the feed-through holes 145 and through the electrolyte diffusion layer 125 and the electrolyte catalyst layer, the liquid halogen electrolyte 111 returns to the mechanical support 140 through a second pattern of feed-through holes 145 which are connected to the electrolyte outlet channel 144. According to an alternative embodiment, the mechanical support 140 can comprise a plurality of electrolyte inlet channels 143 and/or of electrolyte outlet channels 144. According to a further alternative embodiment, the mechanical support 140 can comprise a single electrolyte inlet and outlet channel, thereby forming the known pattern of a "serpentine flowfield". As visible in FIG. 4, the feed-through holes 145 are circular, but according to another embodiment, the feed-through holes 145 can have any other shape, such as for example form square, triangles, rhombus, etc.

Figure 5:
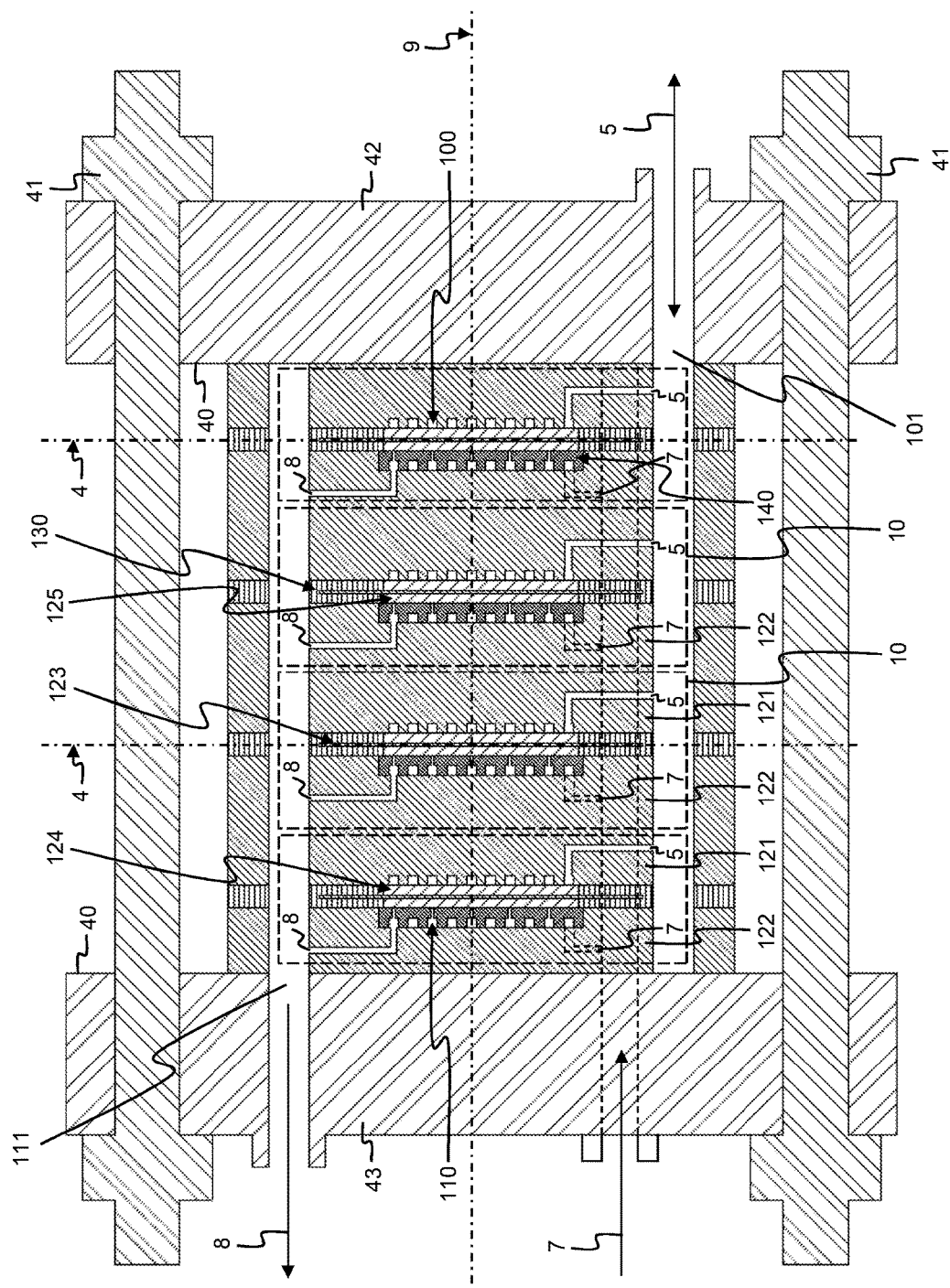
FIG. 5 schematically illustrates a further embodiment of a flow battery assembly comprising a stack of battery cells secured between flanges.

According to an embodiment shown in FIG. 5, the flow battery assembly 1 comprises a plurality of battery cells 10 similar to the battery cell 10 described in the embodiments of FIG. 1 to FIG. 4. Each battery cell 10 comprises a hydrogen electrode 121, an electrolyte electrode 122, a mechanical support 140, a planar membrane 123 extending along a central plane 4, a hydrogen diffusion layer 124, an electrolyte diffusion layer 125 and a sealing 130. The hydrogen electrode 121 of at least one of the battery cells 10 of the flow battery assembly 1 is coupled to the electrolyte electrode 122 of an adjacent battery cell 10. As visible in FIG. 6, the hydrogen electrode 121 of a battery cell 10 and the electrolyte electrode 122 of an adjacent battery cell 10 are formed as a single unit. According to an alternative embodiment, the hydrogen electrode 121 of a battery cell 10 and the electrolyte electrode 122 of an adjacent battery cell 10 are for example connected with one or more electrically conductive wires, or connected with one or more electrically conductive plates. Hydrogen gas 101 flows from a hydrogen reservoir 30 through each hydrogen inlet 5 flow path to each hydrogen chamber 100 of each of the battery cells 10, and returns to the hydrogen reservoir 30 through each hydrogen outlet 5 flow path. Liquid halogen electrolyte 111 flows from an electrolyte reservoir 31 through each electrolyte inlet 7 flow path to each electrolyte chamber 110 of each of the battery cells 10. The liquid halogen electrolyte 111 returns to the electrolyte reservoir 31 through each electrolyte outlet 8 flow path. As visible in FIG. 5, the flow battery assembly 1 comprises flanges 30 in between which the plurality of battery cells are stacked along a longitudinal axis 9. As visible in FIG. 5, the flow battery assembly 1 further comprises fasteners 31 configured to cooperate with the flanges 30 such that the battery cells 10 are secured in between the flanges 30.

Figure 6:
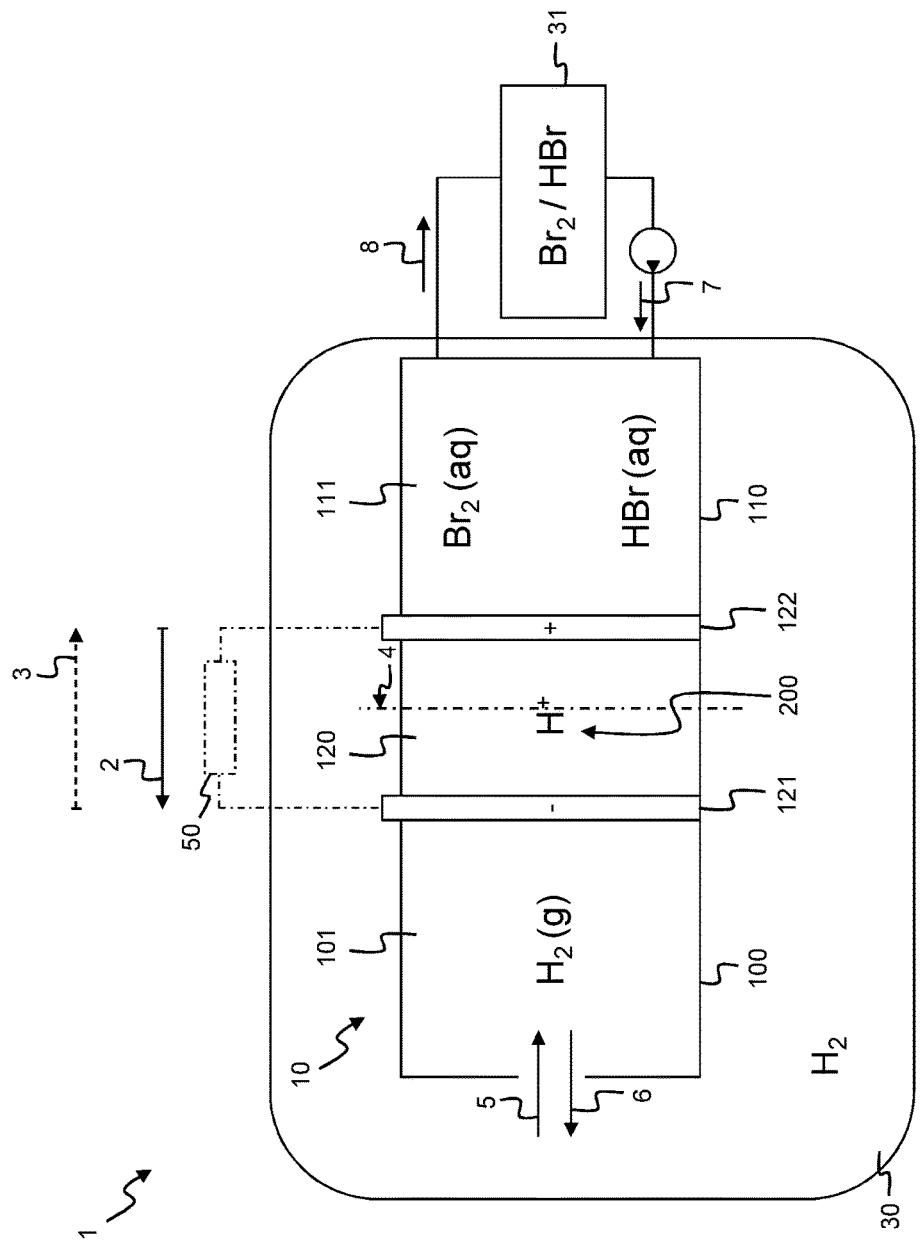
FIG. 6 schematically illustrates an embodiment of a flow battery assembly, of which the battery cells are positioned inside a hydrogen reservoir.

According to an embodiment shown in FIG. 6, the flow battery assembly 1 described similar to the flow battery described in FIG. 1 to FIG. 5 is completely positioned in the hydrogen reservoir 30. The flow battery assembly 1 comprises a battery cell 10 comprising a hydrogen chamber 100, an electrolyte chamber 110, a hydrogen electrode 121, an electrolyte electrode 122, a membrane electrode assembly 120 configured to allow a diffusion of protons 200 during a charge 2 and a discharge 3 operation of the flow battery assembly 1. The potential difference between the hydrogen electrode 121 and the electrolyte electrode 122 can be applied to an electrical load 50 as shown in FIG. 6. An electrolyte reservoir 31 is connected to the electrolyte chamber 110 of the flow battery assembly 1 and comprises liquid halogen electrolyte 111. As shown in FIG. 6, two connections are provided between the electrolyte reservoir 31 and the electrolyte chamber 110, for example in the form of suitable tubes, lines, pipes, connectors, etc., which allows for an inlet flow 7 of liquid halogen electrolyte 111 into the electrolyte chamber 110 from the electrolyte reservoir 31 and an outlet flow 8 of liquid halogen electrolyte 111 out of the electrolyte chamber 110 to the electrolyte reservoir 110. The electrolyte chamber 110 is configured to house a flow path of liquid halogen electrolyte 111 between an electrolyte inlet 7 and an electrolyte outlet 8. A hydrogen reservoir 30 is connected to the hydrogen chamber 100 of the flow battery assembly 1 and is configured to retain hydrogen gas 101. As visible in FIG. 6, the hydrogen chamber 100 is configured to house a flow path of hydrogen gas 101 between a separate hydrogen inlet 5 from a hydrogen reservoir 30 to the hydrogen chamber 100 and a hydrogen outlet 6 from the hydrogen chamber 100 to the hydrogen reservoir 30.

Figure 7:
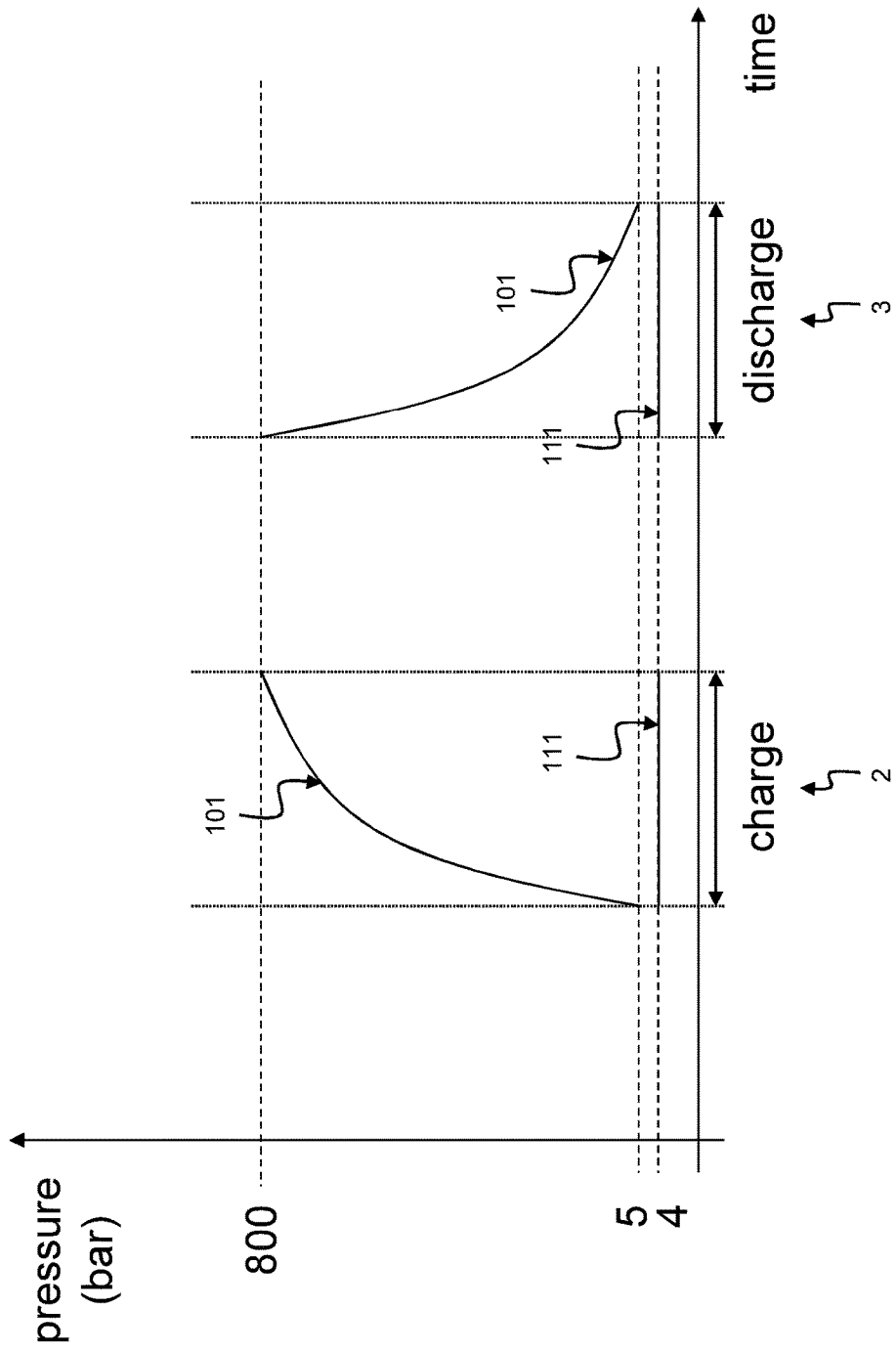
FIG. 7 schematically illustrates the evolution of the pressure in the hydrogen chamber and the electrolyte chamber during a charge and a discharge operation of the flow battery assembly.

According to an embodiment shown in FIG. 7, the evolution of the pressure in the hydrogen chamber 100 and in the electrolyte chamber 110 is shown during a charge 2 and a discharge 3 operation. At the start of the charge 2 operation, the pressure in the hydrogen chamber 100 is of 5 bars, and the pressure in the electrolyte chamber 110 is of 4 bars. During the charge 2 operation, hydrogen is generated according to the reaction (R) described above, and therefore, the pressure in the hydrogen chamber 100 increases, until it reaches 800 bars. During the charge 2 operation, the pressure in the electrolyte chamber 110 decreases or even stays substantially constant. At the start of the discharge 3 operation, the pressure in the hydrogen chamber 100 is of 800 bars, and the pressure in the electrolyte chamber 110 is of 4 bars. During the discharge 3 operation, hydrogen is consumed according to the reaction (R) described above, and therefore, the pressure in the hydrogen chamber 100 decreases, until it reaches 5 bars. During the discharge 3 operation, the pressure in the electrolyte chamber 110 increases or even stays substantially constant.

In addition to the embodiments described above for a hydrogen-halogen flow battery assembly, according to a further embodiment, such a flow battery assembly 1 is also suitable for use as a hydrogen-iron redox flow battery assembly, or in general as any other suitable hydrogen-redox flow battery assembly. In the case of a hydrogen-iron redox flow battery assembly, the liquid electrolyte comprises iron as the electro-active element. The general electrochemical operation principle of the flow battery assembly 1 in the case of a hydrogen-iron redox flow battery assembly can be described with respect to a charge 2 and a discharge operation 3. The relevant charge 2/discharge 3 reactions are described by equation (R).

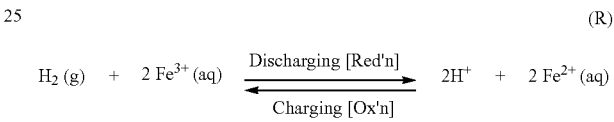

$$E^0 = 0.77 \text{ V} \tag{R}$$

where $H_2$ (g) is hydrogen gas 101, $Fe^{3+}$ (aq) and $Fe^{2+}$ (aq) are iron ions in an aqueous solution, $H^+$ is a proton, and $E^0$ is the standard potential of the $Fe^{3+}/Fe^{2+}$ electrode (0.77 V vs. the Standard Hydrogen Electrode, also referred to as SHE). These reactions can also be described in terms of the half-cell reaction (P) at the electrolyte electrode 122 and the half-cell reaction (N) at the hydrogen electrode 121:

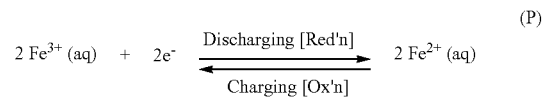

$$E^0 = 0.77 \text{ V} \tag{P}$$

where $Fe^{3+}$ (aq) and $Fe^{2+}$ (aq) are iron ions in an aqueous solution, e– is an electron, and $E^0$ is the standard potential of the $Fe^{3+}/Fe^{2+}$ electrode (0.77 V vs. the Standard Hydrogen Electrode, also referred to as SHE).

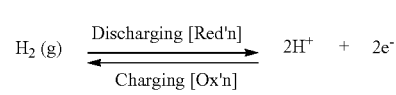

$$E^0 = 0 \text{ V} \tag{N}$$

where $H_2$ (g) is hydrogen gas 101, $e^-$ is an electron, and $H^+$ is a proton.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A hydrogen-redox flow battery assembly comprising:
one or more battery cells, each of the one or more battery cells comprising:
a hydrogen chamber configured to house a flow path of hydrogen gas between a hydrogen inlet and a hydrogen outlet;
an electrolyte chamber configured to house a flow path of liquid electrolyte between an electrolyte inlet and an electrolyte outlet;
a membrane electrode assembly comprising a hydrogen electrode connected to said hydrogen chamber and an electrolyte electrode connected to said electrolyte chamber, and a membrane positioned between said hydrogen chamber and said electrolyte chamber, said membrane electrode assembly configured to only allow a diffusion of protons through said membrane electrode assembly between said hydrogen gas in said hydrogen chamber and said liquid electrolyte in said electrolyte chamber;
a hydrogen reservoir connected to said hydrogen chamber of said one or more battery cells and configured to retain said hydrogen gas; and
an electrolyte reservoir connected to said electrolyte chamber of one or more battery cells and configured to retain said liquid electrolyte;
WHEREIN:
said hydrogen-redox flow battery assembly is further configured to allow an uncontrolled pressure difference between a pressure in said hydrogen chamber of said battery cell and a pressure in said electrolyte chamber of said battery cell, wherein said uncontrolled pressure difference between the pressure in said hydrogen chamber of said battery cell and the pressure in the electrolyte chamber of said battery cell is determined by said diffusion of protons through said membrane electrode assembly during a charge and/or a discharge operation; and
said one or more battery cells of said hydrogen-redox flow battery assembly is/are completely positioned in said hydrogen reservoir.

2. The hydrogen-redox flow battery assembly according to claim 1, wherein said liquid electrolyte comprises a halogen element comprising one or more of the following:
fluorine;
chlorine;
bromine;
iodine;
astatine;
or wherein said liquid electrolyte comprises iron, cerium or vanadium.

3. The hydrogen-flow battery assembly according to claim 1, wherein:
said hydrogen chamber and said hydrogen reservoir are directly coupled to each other without a pressure regulating element such that said pressure in said hydrogen chamber and a pressure in said hydrogen reservoir are allowed to fluctuate in an uncontrolled manner; and/or
said electrolyte chamber and said electrolyte reservoir are directly coupled to each other without a pressure regulating element such that said pressure in said electrolyte chamber and a pressure in said electrolyte reservoir are allowed to fluctuate in an uncontrolled manner.

4. The hydrogen-redox flow battery assembly according to claim 1, wherein said hydrogen-redox flow battery assembly is further configured to allow an uncontrolled pressure difference between said hydrogen reservoir and said electrolyte reservoir, wherein said pressure difference between said hydrogen reservoir and said electrolyte reservoir is determined by said diffusion of protons through said membrane electrode assembly during a charge and/or a discharge operation.

5. The hydrogen-redox flow battery assembly according to claim 1, wherein said pressure in said hydrogen chamber is allowed to fluctuate in an uncontrolled manner between a predetermined minimum pressure value when said battery cell is fully discharged and a predetermined maximum pressure value when said battery cell is fully charged.

6. The hydrogen-redox flow battery assembly according to claim 5, wherein said predetermined minimum pressure value is between 1.1 and 800 bar and said predetermined maximum pressure value is between 1.1 and 800 bar.

7. The hydrogen-redox flow battery assembly according to claim 6, wherein said predetermined minimum pressure value is between 5 and 150 bar and said predetermined maximum pressure value is between 5 and 150 bar.

8. The hydrogen-redox flow battery assembly according to claim 1, wherein each of the one or more battery cells further comprises:
a planar membrane extending along a central plane and comprising a hydrogen surface positioned on one side of said central plane and an electrolyte surface positioned on an opposite side of said central plane, said planar membrane configured to only allow said diffusion of protons;
a hydrogen diffusion layer comprising a membrane side and an opposite hydrogen side and configured to cover said hydrogen surface with its membrane side;
said hydrogen electrode further comprising a hydrogen electrode contact surface configured to partially cover said opposite hydrogen side of said hydrogen diffusion layer;

said flow path of the hydrogen gas comprises a hydrogen flow path contact surface configured to partially cover said hydrogen side of said hydrogen diffusion layer;

an electrolyte diffusion layer comprising a membrane side and an opposite electrolyte side and configured to cover said electrolyte surface with its membrane side;

said electrolyte electrode further comprising an electrolyte electrode contact surface configured to partially cover said electrolyte side of said electrolyte diffusion layer; and said flow path of the liquid electrolyte comprises an electrolyte flow path contact surface configured to partially cover said electrolyte side of said electrolyte diffusion layer.

9. The hydrogen-redox flow battery assembly according to claim 8, wherein said electrolyte electrode further comprises a mechanical support made of a material with a value of yield strength larger than a predetermined yield strength threshold such that a maximum allowable deformation of the planar membrane can be guaranteed when in a fully charged state, said mechanical support comprising said electrolyte electrode contact surface and housing said electrolyte flow path contact surface.

10. The hydrogen-redox flow battery assembly according to claim 9, wherein said predetermined yield strength threshold is larger than 30 MPa.

11. The hydrogen-redox flow battery assembly according to claim 9, wherein said mechanical support comprises:

a membrane support surface in contact with said electrolyte diffusion layer and comprising said electrolyte electrode contact surface;

an opposite support surface housing said electrolyte flow path in the form of an electrolyte inlet channel and an electrolyte outlet channel both extending into said mechanical support from said opposite support surface;

feed-through holes extending through said mechanical support from said electrolyte inlet channel and said electrolyte outlet channel to said membrane support surface, thereby forming said electrolyte flow path contact surface.

12. The hydrogen-redox flow battery assembly according to claim 11, wherein said electrolyte inlet channel and said electrolyte outlet channel form an interdigitated flow path for said liquid electrolyte.

13. The hydrogen-redox flow battery assembly according to claim 11, wherein the one or more battery cells is configured such that said electrolyte electrode contact surface is larger than said electrolyte flow path contact surface.

14. The hydrogen-redox flow battery assembly according to claim 13, wherein the one or more battery cells is configured such that said electrolyte electrode contact surface is 80% or more of the membrane support surface.

15. The hydrogen-redox flow battery assembly according to claim 8, wherein the one or more battery cells is configured such that said electrolyte electrode contact surface is larger than said electrolyte flow path contact surface.

16. The hydrogen-redox flow battery assembly according to claim 15, wherein the one or more battery cells is configured such that said electrolyte electrode contact surface is 80% or more of a membrane support surface.

17. The hydrogen-redox flow battery assembly according to claim 1, wherein:

said one or more battery cells comprise a plurality of battery cells; and said hydrogen electrode of at least one of said plurality of battery cells is coupled to said electrolyte electrode of a next one of said plurality of battery cells.

18. The hydrogen-redox flow battery assembly according to claim 17, wherein said hydrogen electrode and said electrolyte electrode of said coupled battery cells are formed as a single unit.

19. The hydrogen-redox flow battery assembly according to claim 1, wherein said electrolyte reservoir of said hydrogen-redox flow battery assembly is completely positioned in said hydrogen reservoir.

* * * * *